United States Patent
Carlson et al.

(10) Patent No.: US 10,623,538 B1
(45) Date of Patent: *Apr. 14, 2020

(54) HINGED ELECTRONIC DEVICE WITH CHAMBERS ACCOMMODATING A DYNAMIC FLEXIBLE SUBSTRATE AND CORRESPONDING SYSTEMS

(71) Applicant: Motorola Mobility LLC, Chicago, IL (US)

(72) Inventors: Christopher Carlson, Libertyville, IL (US); Steve Emmert, McHenry, IL (US)

(73) Assignee: Motorola Mobility LLC, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/721,719

(22) Filed: Dec. 19, 2019

Related U.S. Application Data

(63) Continuation of application No. 16/551,296, filed on Aug. 26, 2019, which is a continuation of application No. 16/255,693, filed on Jan. 23, 2019, now Pat. No. 10,469,635.

(51) Int. Cl.
*H04M 1/00* (2006.01)
*H04M 1/02* (2006.01)

(52) U.S. Cl.
CPC ....... *H04M 1/0216* (2013.01); *H04M 1/0268* (2013.01); *H04M 1/0277* (2013.01)

(58) Field of Classification Search
None
See application file for complete search history.

(56) References Cited

U.S. PATENT DOCUMENTS

| | | | |
|---|---|---|---|
| 2006/0050490 A1* | 3/2006 | Ootani | H05K 1/028 361/755 |
| 2007/0123064 A1 | 5/2007 | Shinoda | |
| 2010/0147581 A1 | 6/2010 | Mitomi | |
| 2012/0306705 A1 | 12/2012 | Sakurai et al. | |
| 2013/0335929 A1 | 12/2013 | Cavallaro | |

(Continued)

OTHER PUBLICATIONS

"El reloj inteligente de Motorola con pantalla flexible", Article published Dec. 28, 2013; http://www.reloj-inteligente.com/el-reloj-inteligente-de-motorola-con-pantalla-flexible/.

(Continued)

*Primary Examiner* — Erika A Washington
(74) *Attorney, Agent, or Firm* — Philip H. Burrus, IV

(57) ABSTRACT

An electronic device includes a first device housing and a second device housing. A hinge couples the first device housing to the second device housing. The first device housing is pivotable about the hinge relative to the second device housing. The hinge separates a first chamber defined by the first device housing and a second chamber defined by the second device housing. A flexible substrate passes through the first chamber and the second chamber. The flexible substrate spans the hinge, either by passing through or around a hinge housing. The flexible substrate deforms to a curvilinear deformed state within one or both of the first chamber or the second chamber when the first device housing and the second device housing pivot about the hinge from a closed position to an axially displaced open position.

20 Claims, 10 Drawing Sheets

(56) References Cited

U.S. PATENT DOCUMENTS

2017/0357473 A1   12/2017   Kim

OTHER PUBLICATIONS

Harmon, et al., "Dual Spring and Driver Assembly and Corresponding Electronic Devices", Specification; Application filed Sep. 10, 2018.
Nester, Don , "Less Is More", Fabricating Metalworking; Published Mar. 4, 2014; http://www.fabricatingandmetalworking.com/2014/03/less-is-more-2/.
Washington, Erika , "Notice of Allowance", U.S. Appl. No. 16/255,693, filed Jan. 23, 2019; dated Sep. 9, 2019.
Washington, Erika Alise , "NonFinal Office Action", U.S. Appl. No. 16/255,693, filed Jan. 23, 2019; dated Jun. 14, 2019.
Washington, Erika Alise , "NonFinal Office Action", U.S. Appl. No. 16/551,296, filed Aug. 26, 2019; dated Sep. 18, 2019.
Washington, Erika Alise , "Notice of Allowance", U.S. Appl. No. 16/551,296, filed Aug. 26, 2019; dated Jan. 9, 2020.

* cited by examiner

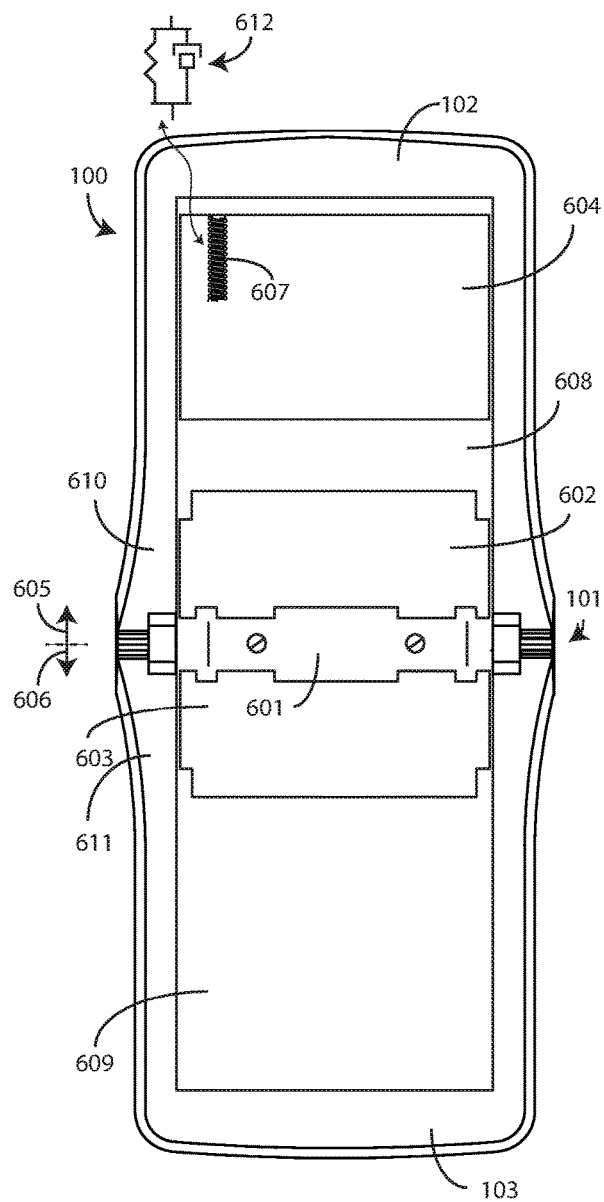 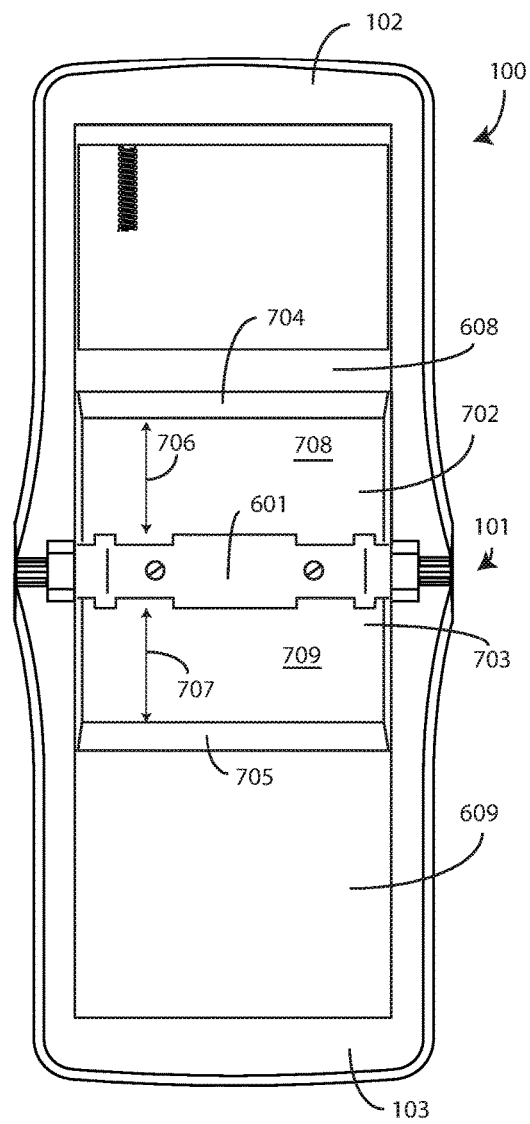
*FIG. 6*  *FIG. 7*

US 10,623,538 B1

HINGED ELECTRONIC DEVICE WITH CHAMBERS ACCOMMODATING A DYNAMIC FLEXIBLE SUBSTRATE AND CORRESPONDING SYSTEMS

CROSS REFERENCE TO PRIOR APPLICATIONS

This application is a continuation application claiming priority and benefit under 35 U.S.C. § 120 from U.S. application Ser. No. 16/551,296, filed Aug. 26, 2019, which is a continuation application claiming priority and benefit under 35 U.S.C. § 120 from U.S. application Ser. No. 16/255,693, filed Jan. 23, 2019, now U.S. Pat. No. 10,469,635, each of which is incorporated by reference for all purposes.

BACKGROUND

Technical Field

This disclosure relates generally to electronic devices, and more particularly to hinged electronic devices.

Background Art

Portable electronic communication devices, especially smartphones, have become ubiquitous. People all over the world use such devices to stay connected. These devices have been designed in various mechanical configurations. A first configuration, known as a "candy bar," is generally rectangular in shape, has a rigid form factor, and has a display disposed along a major face of the electronic device. By contrast, a "clamshell" device has a mechanical hinge that allows one housing to pivot relative to the other.

Some consumers prefer candy bar devices, while others prefer clamshell devices. To satisfy the latter, it would thus be desirable to have an improved hinged electronic device.

BRIEF DESCRIPTION OF THE DRAWINGS

FIG. 6 illustrates a plan view of one explanatory electronic device in accordance with embodiments of the disclosure with the flexible display removed so that the hinge is visible.

FIG. 7 illustrates a plan view of one explanatory electronic device in accordance with embodiments of the disclosure with the flexible display and support plates removed so that details of the housing are visible.

Figure 1:
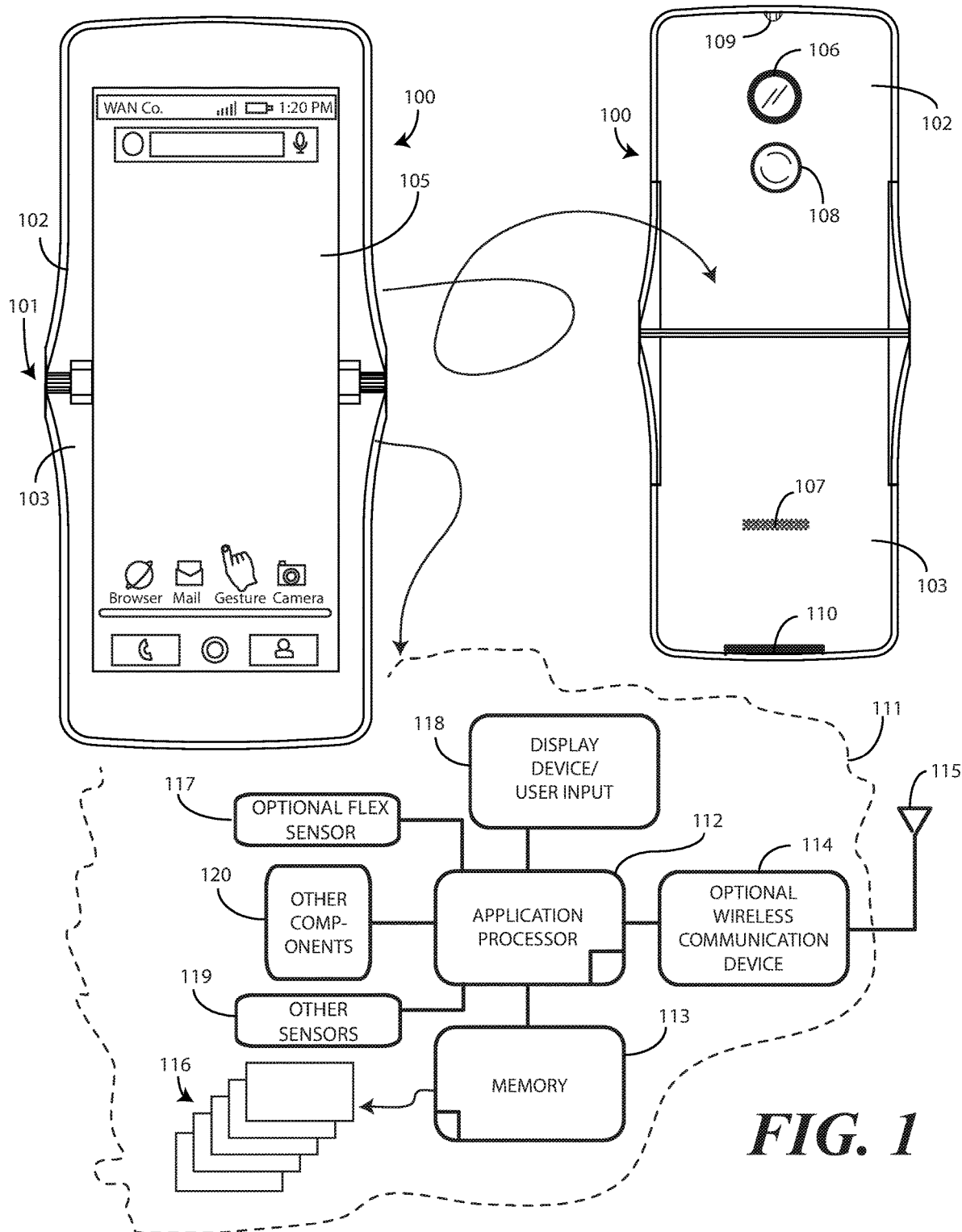
FIG. 1 illustrates one explanatory electronic device in accordance with one or more embodiments of the disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

DETAILED DESCRIPTION OF THE DRAWINGS

Embodiments of the disclosure are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Relational terms such as first and second, top and bottom, and the like may be used solely to distinguish one entity or action from another entity or action without necessarily requiring or implying any actual such relationship or order between such entities or actions. As used herein, components may be "operatively coupled" when information can be sent between such components, even though there may be one or more intermediate or intervening components between, or along the connection path. The terms "substantially" and "about" are used to refer to dimensions, orientations, or alignments inclusive of manufacturing tolerances. Thus, a "substantially orthogonal" angle with a manufacturing tolerance of plus or minus two degrees would include all angles between 88 and 92, inclusive. Also, reference designators shown herein in parenthesis indicate components shown in a figure other than the one in discussion. For example, talking about a device (10) while discussing figure A would refer to an element, 10, shown in figure other than figure A.

Embodiments of the disclosure provide an electronic device that includes at least a first device housing and a second device housing. In one or more embodiments, a hinge couples the first device housing to the second device housing so that the first device housing is pivotable about the hinge relative to the second device housing to one or more of a bent configuration, a folded configuration, or other configuration. In one or more embodiments, a flexible display is coupled to the first device housing and the second device housing and spans the hinge. The flexible display deforms when the first device housing pivots about the hinge relative to the second device housing. In other embodiments, the first device housing and the second device housing each have coupled thereto a separate display, which may be rigid or flexible. For example, a first display may be coupled to the first device housing on one side of the hinge, while a second display is coupled to the second device housing on a second side of the hinge.

In one or more embodiments, the hinge not only facilitates the bending operation, but also works to allow a flexible substrate, configured as a flexible printed circuit board in one embodiment, to dynamically transform and change lengths as a function of whether the first device housing and the second device housing are in the axially displaced open position, the closed position, or somewhere in between. In one or more embodiments, each of the first device housing and the second device housing includes a chamber positioned adjacent to the hinge. Illustrating by example, if the hinge runs vertically and the electronic device is viewed in the axially displaced open position in a plan view, a first chamber defined by the first device housing may be disposed to the left of the hinge, while a second chamber defined by the second device housing is disposed to the right of the hinge, and so forth.

The flexible substrate, in one or more embodiments, includes both conductive and insulative layers and functions as a printed wiring board delivering voltage, current, and electrical signals through conductive traces from one electrically conductive pad to another. In one or more embodiments, the flexible substrate is used to deliver voltage, current, and electrical signals from one or more electrical circuit components disposed in the first device housing to one or more other electrical circuit components disposed in the second device housing, and vice versa.

In one or more embodiments, the flexible substrate is electrically coupled to the one or more electrical circuit components in the first device housing, and further has a first end that is mechanically anchored within the first device housing at a first location. Similarly, the flexible substrate is electrically coupled to the one or more other electrical circuit components in the second device housing, and further has a second end that is mechanically anchored within the second device housing at a second location. The flexible substrate then passes from the first location through the first chamber. The flexible substrate then spans the hinge, and further passes through the second chamber to the second location.

In one or more embodiments, when the first device housing and the second device housing pivot about the hinge to the closed position, the flexible substrate is extended so as to be more slack between the first anchor location and the second anchor location. To illustrate, in one or more embodiments the flexible substrate defines a first dynamic region between the first location where the first end is anchored in the first device housing and the hinge. The flexible substrate also defines a second dynamic region between the second location where the second end is anchored in the second device housing and the hinge. A hinge-spanning region is then defined between the first dynamic region and the second dynamic region.

In one or more embodiments, the first dynamic region and the second dynamic region each extend a first distance between the hinge and the first location and the second location, respectively, when the first device housing and the second device housing pivot about the hinge to the closed position. In one or more embodiments, this causes a reduction of slack in the flexible substrate, as both the first dynamic region and the second dynamic region are partially or completely straightened to define substantially linear extensions spanning each of the first chamber and the second chamber, respectively.

By contrast, when the first device housing and the second device housing pivot about the hinge from the closed position to the axially displaced open position, in one or more embodiments the first dynamic region and the second dynamic region deform. For instance, one or more bends, curves, folds, or other deformations can be introduced into the flexible substrate due to the distance between the first location in the first device housing and the second location in the second device housing becoming shorter. This causes the first dynamic region and the second dynamic region to extend a second distance between the hinge and the first location and the second location, respectively. In one or more embodiments, this second distance is less than the first distance.

In one or more embodiments, this deformation of the flexible substrate causes the flexible substrate to take on a curvilinear shape. One or more apexes and one or more nadirs may be introduced into the flexible substrate. In one or more embodiments, the first chamber and the second chamber each have an upper surface and a lower surface. These surfaces can function to limit amplitude of the one or more apexes and/or the depth of the one or more nadirs.

In some embodiments, the surfaces are integral portions of the device housings. For example, the upper surface and the lower surface of the first chamber can comprise portions of the first device housing, while the upper surface and the lower surface of the second chamber comprise portions of the second device housing. In other embodiments, movable support plates coupled to the hinge can define the upper surfaces, while housing portions define the lower surfaces. A first support plate can define the upper surface of the first chamber, while a second support plate defines the upper surface of the second chamber, and so forth.

In one or more embodiments, the flexible substrate takes on a shape—when viewed from the edge—that is at least partially oscillating, meaning that the shape moves up and then moves down, optionally repeating one or more times. This at least partially oscillating shape can take the appearance of a dampened oscillation shape, with progressively smaller apexes and nadirs. Alternatively, the at least partially oscillating shape can have equal apexes and nadirs that are bounded by the upper surface and lower surface of the first chamber and second chamber, respectively. Of course combinations can occur. Moreover, the flexible substrate can take other shapes as well when compressing and deforming due to the first device housing pivoting about the hinge relative to the second device housing from the closed position to the axially displaced open position.

Where a flexible display is included in addition to the flexible substrate, the first chamber and the second chamber can perform other functions as well. These additional functions can even improve the reliability and usability of the flexible display. In one or more embodiments, first chamber and the second chamber are configured not only to allow the flexible substrate to deform when the first device housing pivots about the hinge relative to the second device housing from the closed position to the axially displaced open position, but are also configured to allow the flexible display to define a service loop.

In one or more embodiments, one or more support plates are coupled to the hinge. The one or more support plates are then pivotable about the hinge when the first device housing pivots about the hinge relative to the second device housing. In one or more embodiments, a first support plate is pivotally coupled to a first side of the hinge. The first support plate then extends distally into the first device housing, and more particularly into the first chamber, from the first side of the hinge. Similarly, a second support plate is pivotally coupled to a second side of the hinge. The second support plate extends distally into the second device housing, and into the second chamber in one or more embodiments, from the second side of the hinge.

Where the support plates are included, the hinge housing and its corresponding support plates serve three functions. First, they provide mechanical support for the flexible display when the first device housing has pivoted about the hinge relative to the second device housing to an axially displaced open position. Second, they allow the flexible display to define a service loop when the first device housing has pivoted about the hinge relative to the second device housing to the closed position. Third, they provide a mechanism for the flexible substrate to extend a first distance about the first support plate, the hinge, and the second support plate when the first device housing has pivoted about the hinge relative to the second device housing to the closed position, while at the same time allowing the flexible substrate to dynamically deform and compress within each of the first chamber and the second chamber when the first device housing has pivoted about the hinge relative to the second device housing to the axially displaced open position.

In one or more embodiments, when the first device housing pivots about the hinge relative to the second device housing to a closed position in which interior surfaces of the first device housing and the second device housing abut, the support plates translate along inclined planes within the first chamber and second chamber, respectively, to recede into the first device housing and second device housing. Said differently, when the first device housing pivots about the hinge relative to the second device housing to the closed position, the support plates move toward the exterior surfaces of the first device housing and the second device housing, thereby receding "outward" from the interior surfaces of the first device housing and the second device housing.

This "collapse" of the first support plate and the second support plate creates a cavity in the first chamber and the second chamber. This cavity allows the flexible display to form a service loop when the electronic device is in the closed position. The service loop prevents the flexible display from being damaged or developing memory in the folded position when the electronic device is in the closed position. The collapse also serves to expand the length of the flexible substrate. When the first device housing and the second device housing are in the closed position, the flexible substrate spans not only the hinge, but also the "outer" surfaces of the first support plate and the second support plate as well in one or more embodiments. In some embodiments, the flexible substrate is stretched so as to be substantially or fully straight about the first support plate, the hinge, and the second support plate on opposite sides of these components from the flexible display.

Embodiments of the disclosure contemplate that bending operations occurring in a housing of an electronic device with a flexible display can present technical challenges. Illustrating by example, it can be difficult to provide uniform mechanical support beneath the flexible display when the electronic device is in the open position. It can further be difficult to limit deformation due to bending operations such that the deformation occurs within a predefined radius. It can still further be difficult to transfer voltage, current, and other electrical signals from circuitry in one device housing to circuitry in another device housing, about the hinge, while keeping the overall thickness of the device relatively small.

Advantageously, embodiments of the disclosure provide solutions to each one of these challenges. Specifically hinges configured in accordance with one or more embodiments of the disclosure allow the first dynamic region and the second dynamic region of the flexible substrate to deform and bend when the first device housing and the second device housing pivot about the hinge from the closed position to the axially displaced open position. In one or more embodiments, the flexible substrate is less slack about the hinge when the first device housing and the second device housing pivot about the hinge to the closed position and more slack between the first location and the hinge and the second location and the hinge, respectively, when the first device housing and the second device housing pivot to the axially displaced open position. Additionally, where a flexible display and support plates are included, embodiments of the disclosure offer a solution that provides the needed system flexibility by providing support for the flexible display when in the open position, but allows for a large radius service loop of the flexible display to occur when the electronic device is in the closed position.

In one or more embodiments, a hinge couples a first device housing to a second device housing. The first device housing is configured so as to be pivotable about the hinge relative to the second device housing. In one or more embodiments, the hinge separates a first chamber defined by the first device housing and a second chamber defined by the second device housing.

In one or more embodiments, a flexible substrate passes through the first chamber and the second chamber. Additionally, in one or more embodiments the flexible substrate spans, either by passing between hinge body portions or around the hinge, as it passes from the first chamber to the second chamber. In other embodiments, the flexible substrate passes through a channel in the hinge.

In one or more embodiments, the flexible substrate deforms within one or both of the first chamber or the second chamber when the first device housing and the second device housing pivot about the hinge from an axially displaced open position. For example, where the flexible substrate includes a first end fixedly mechanically and/or electrically coupled to a first location within the first device housing, and a second end that is fixedly mechanically and/or electrically coupled to a second location within the device housing, in one or more embodiments the first chamber and the second chamber are situated between these locations and the hinge. Said differently, in one embodiment the first chamber is disposed between the first location and the hinge, while the second chamber is disposed between the second location and the hinge.

In one or more embodiments, slack in the flexible substrate is removed between the first location and the second location when the first device housing and the second device housing are pivoted about the hinge to the closed position. By contrast, as the first location and the second location move together due to the first device housing and second device housing pivoting from the closed position to the axially displaced open position, in one or more embodiments slack is introduced into the flexible substrate, causing it to deform and take on a curvilinear shape. This curvilinear shape can define at least one apex and at least one nadir.

In one or more embodiments, each of the first chamber and the second chamber additionally comprise an inclined plane, which is physically separated from the hinge by a predefined distance. Where the support plates are included, a distal end of each support plate contacts the inclined plane to translate along the inclined plane when the first device housing pivots about the hinge relative to the second device housing. Thus, if a first side of a first support plate is coupled to the hinge, a second, distal side of the first support plate contacts the inclined plane in the support plate receiving recess of the first device housing. The second, distal side of the first support plate then translates along the inclined plane when the first device housing pivots about the hinge relative to the second device housing. A second support plate and support plate receiving recess can be similarly configured in the second device housing.

The distal ends of each of the first support plate and the second support plate therefore travel, in one or more embodiments, along their respective inclined planes between a first position within the first device housing and the second device housing, respectively, to a second position within the first device housing and the second device housing, respectively, when the first device housing and the second device housing pivot about the hinge from an axially displaced open position to a closed position.

These support plates can be used to provide mechanical support for a flexible display that spans the hinge. In one or more embodiments where a flexible display is included, the support plates are closer to the flexible display when in the first position, and are farther from the flexible display when in the second position. In one or more embodiments, the support plates are farther from exterior surfaces of the first device housing and the second device housing when in the first position, but are closer to those outer surfaces of the first device housing and the second device housing when in the second position. This results in the second position being deeper within the first device housing and the second device housing, respectively, than the first position.

In one or more embodiments, the flexible display is positioned within a linear recess of the first device housing and the second device housing so that it—or a fascia disposed atop the flexible display—can be flush with the interior surfaces of the first device housing and second device housing, respectively. In other embodiments, the linear recess will be omitted and the flexible display will simply sit atop planar interior surfaces of the first device housing and the second device housing. In either embodiment, when the first device housing pivots about the hinge relative to the second device housing to the axially displaced, open position, the first support plate, the hinge, and the second support plate bridge the linear recess (or planar interior surfaces) to provide mechanical support for the flexible display. By contrast, by receding into the housings, the first support plate, the hinge, and the second support plate define boundaries within which the flexible display defines a service loop when the first device housing and the second device housing pivot about the hinge from the axially displaced open position to a closed position.

Embodiments of the disclosure thus provide a novel hinge mechanism that allows a flexible substrate with one or more electrical traces to connect at least a first circuit element disposed within the first device housing to at least a second circuit element disposed within the second device housing. End regions of the flexible substrate, fixed to locations within the first device housing and the second device housing, respectively, are disposed to either side of dynamic (movable) regions. A middle region of the flexible substrate, disposed between the dynamic regions, then spans a hinge housing of the hinge, or alternatively passes through a channel of the hinge housing.

The dynamic regions of the flexible substrate are disposed within chambers of the first device housing and the second device housing, respectively, and thus translate from flat shape to curvilinear shape, which in one embodiment is at least partially oscillatory, as the first device housing and the second device housing pivot from the closed position to the axially displaced open position. In one or more embodiments, upper and lower surfaces of the first chamber and the second chamber define upper and lower limits of the curvilinear shape of the flexible substrate in the dynamic regions. The middle region can then be controlled in position by the hinge between the two dynamic regions, or alternatively can be allowed to move side-to-side independent of the hinge housing. For example, mechanical features, adhesives, or other devices can retain the middle region in a fixed location within the hinge body so that it is unable to translate laterally in one embodiment. In other embodiments, the middle region can be situated within the hinge body without being affixed thereto. In this latter embodiment, the middle region may translate slightly to the left of the hinge body, or to the right, when the first device housing and the second device housing pivot from the closed position to the axially displaced open position and vice versa.

Where a flexible display is included, hinges configured in accordance with embodiments of the disclosure can further properly support said flexible display when a hinged electronic device is in the open position. Embodiments of the disclosure contemplate that the mechanical stack of the flexible display is frequently too soft or flexible to support itself. Accordingly, when the electronic device is in the open position the support plates provide rigid support across the hinge portion of the electronic device. At the same time, the support plates recede into the housing when the electronic device is folded to allow the flexible display to form a service loop. Advantageously, the hinge and corresponding support plates define kinematic linkages that move when the first device housing pivots about the hinge relative to the second device housing to the closed position. As noted above, the support plates recede backwards (along the Z-axis) to provide space for the flexible display to bend into a teardrop shaped service loop. In one or more embodiments, one or both of the first device housing or the second device housing can also include a spring loaded support plate that stretches the flexible display when the electronic device is in the open position.

Turning now to FIG. 1, illustrated therein is one explanatory electronic device 100 configured in accordance with one or more embodiments of the disclosure. The electronic device 100 of FIG. 1 is a portable electronic device. For illustrative purposes, the electronic device 100 is shown as a smartphone. However, the electronic device 100 could be any number of other devices as well, including tablet computers, gaming devices, multimedia players, and so forth. Still other types of electronic devices can be configured in accordance with one or more embodiments of the disclosure as will be readily appreciated by those of ordinary skill in the art having the benefit of this disclosure.

The electronic device 100 includes a first device housing 102 and a second device housing 103. In one or more embodiments, a hinge 101 couples the first device housing 102 to the second device housing 103. In one or more embodiments, the first device housing 102 is selectively pivotable about the hinge 101 relative to the second device housing 103. For example, in one or more embodiments the first device housing 102 is selectively pivotable about the hinge 101 between a closed position, shown and described below with reference to FIG. 2, and an open position, shown and described below with reference to FIGS. 4-5.

In one or more embodiments the first device housing 102 and the second device housing 103 are manufactured from a rigid material such as a rigid thermoplastic, metal, or composite material, although other materials can be used. Still other constructs will be obvious to those of ordinary skill in the art having the benefit of this disclosure. In the illustrative embodiment of FIG. 1, the electronic device 100 includes a single hinge. However, in other embodiments two or more hinges can be incorporated into the electronic device 100 to allow it to be folded in multiple locations.

This illustrative electronic device 100 of FIG. 1 includes a display 105. The display 105 can optionally be touch-sensitive. In one embodiment where the display 105 is touch-sensitive, the display 105 can serve as a primary user interface of the electronic device 100. Users can deliver user input to the display 105 of such an embodiment by delivering touch input from a finger, stylus, or other objects disposed proximately with the display.

In one embodiment, the display 105 is configured as an organic light emitting diode (OLED) display fabricated on a flexible plastic substrate. This allows the display 105 to be flexible so as to deform when the first device housing 102 pivots about the hinge 101 relative to the second device housing 103. However, it should be noted that other types of displays would be obvious to those of ordinary skill in the art having the benefit of this disclosure. Illustrating by example, as will be described in more detail with reference to FIG. 10 below, in other embodiments multiple displays can be used. For instance, a first rigid display can be coupled to the first device housing 102, while a second, separate rigid display can be coupled to the second device housing 103, with the hinge 101 separating the two displays.

Where a flexible display is used, in one or more embodiments an OLED is constructed on flexible plastic substrates can allow the display 105 to become flexible with various bending radii. For example, some embodiments allow bending radii of between thirty and six hundred millimeters to provide a bendable display. Other substrates allow bending radii of around five millimeters to provide a display that is foldable through active bending.

Other displays can be configured to accommodate both bends and folds. In one or more embodiments the display 105 may be formed from multiple layers of flexible material such as flexible sheets of polymer or other materials. In this illustrative embodiment, the display 105 is coupled to the first device housing 102 and the second device housing 103. Accordingly, the display 105 spans the hinge 101 in this embodiment.

Features can be incorporated into the first device housing 102 and/or the second device housing 103. Examples of such features include an optional camera 106 or an optional speaker port 107, which are shown disposed on the rear side of the electronic device 100 in this embodiment, but could be placed on the front side as well. In this illustrative embodiment, a user interface component 108, which may be a button or touch sensitive surface, can also be disposed along the rear side of the first device housing 102. As noted, any of these features are shown being disposed on the rear side of the electronic device 100 in this embodiment, but could be located elsewhere, such as on the front side in other embodiments.

In one embodiment, the electronic device 100 includes one or more optional connectors 109,110, which can include an analog connector, a digital connector, or combinations thereof. In this illustrative embodiment, connector 109 is an analog connector disposed on a first end, i.e., the top end as viewed in FIG. 1, of the electronic device 100, while connector 110 is a digital/power connector disposed on a second end opposite the first end, which is the bottom end as viewed in FIG. 1.

A block diagram schematic 111 of the electronic device 100 is also shown in FIG. 1. The block diagram schematic 111 can be configured as a printed circuit board assembly disposed within either or both of the first device housing 102 or the second device housing 103 of the electronic device 300. Various components can be electrically coupled together by conductors or a bus disposed along one or more printed circuit boards. For example, some components of the block diagram schematic 111 can be configured as a first electronic circuit fixedly situated within the first device housing 102, while other components of the block diagram schematic 111 can be configured as a second electronic circuit fixedly situated within the second device housing 103. As will be described in more detail below, a flexible substrate can then span the hinge 101 to electrically couple the first electronic circuit to the second electronic circuit.

In one embodiment, the electronic device 100 includes one or more processors 112. In one embodiment, the one or more processors 112 can include an application processor and, optionally, one or more auxiliary processors. One or both of the application processor or the auxiliary processor(s) can include one or more processors. One or both of the application processor or the auxiliary processor(s) can be a microprocessor, a group of processing components, one or more ASICs, programmable logic, or other type of processing device.

The application processor and the auxiliary processor(s) can be operable with the various components of the electronic device 100. Each of the application processor and the auxiliary processor(s) can be configured to process and execute executable software code to perform the various functions of the electronic device 100. A storage device, such as memory 113, can optionally store the executable software code used by the one or more processors 112 during operation.

In this illustrative embodiment, the electronic device 100 also includes a communication circuit 114 that can be configured for wired or wireless communication with one or more other devices or networks. The networks can include a wide area network, a local area network, and/or personal area network. Examples of wide area networks include GSM, CDMA, W-CDMA, CDMA-2000, iDEN, TDMA, 2.5 Generation 3GPP GSM networks, 3rd Generation 3GPP WCDMA networks, 3GPP Long Term Evolution (LTE) networks, and 3GPP2 CDMA communication networks, UMTS networks, E-UTRA networks, GPRS networks, iDEN networks, and other networks.

The communication circuit 114 may also utilize wireless technology for communication, such as, but are not limited to, peer-to-peer or ad hoc communications such as HomeRF, Bluetooth and IEEE 802.11 (a, b, g or n), and other forms of wireless communication such as infrared technology. The communication circuit 114 can include wireless communication circuitry, one of a receiver, a transmitter, or transceiver, and one or more antennas 115.

In one embodiment, the one or more processors 112 can be responsible for performing the primary functions of the electronic device 100. For example, in one embodiment the one or more processors 112 comprise one or more circuits operable with one or more user interface devices, which can include the display 105, to present, images, video, or other presentation information to a user. The executable software code used by the one or more processors 112 can be configured as one or more modules 116 that are operable with the one or more processors 112. Such modules 116 can store instructions, control algorithms, logic steps, and so forth.

In one embodiment, the one or more processors 112 are responsible for running the operating system environment of the electronic device 100. The operating system environment can include a kernel and one or more drivers, and an application service layer, and an application layer. The operating system environment can be configured as executable code operating on one or more processors or control circuits of the electronic device 100. The application layer can be responsible for executing application service modules. The application service modules may support one or more applications or "apps." The applications of the application layer can be configured as clients of the application service layer to communicate with services through application program interfaces (APIs), messages, events, or other inter-process communication interfaces. Where auxiliary processors are used, they can be used to execute input/output functions, actuate user feedback devices, and so forth.

Figure 2:
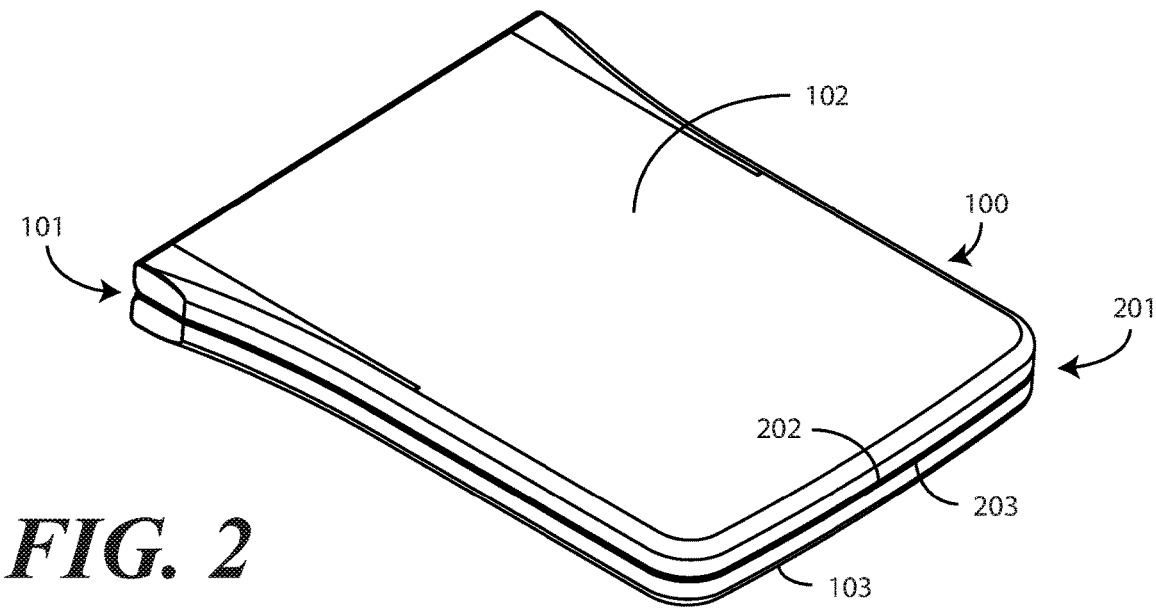
FIG. 2 illustrates a perspective view of one explanatory electronic device in accordance with one or more embodiments of the disclosure in a closed position.
Figure 3:
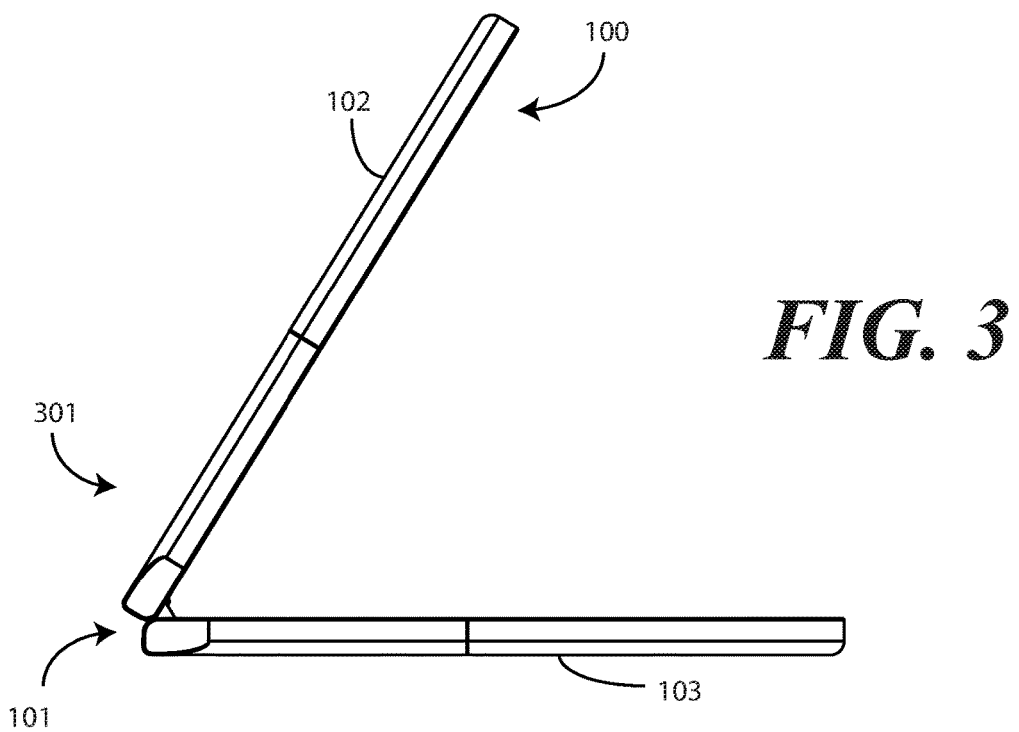
FIG. 3 illustrates a side elevation view of one explanatory electronic device in accordance with one or more embodiments of the disclosure in a partially open position.

In one embodiment, the electronic device 100 optionally includes one or more flex sensors 117, operable with the one or more processors 112, to detect a bending operation that causes the first device housing 102 to pivot about the hinge 101 relative to the second device housing 103, thereby transforming the electronic device 100 into a deformed geometry, such as that shown in FIGS. 2-3. The inclusion of flex sensors 117 is optional, and in some embodiment flex sensors 117 will not be included.

In one embodiment, the one or more processors 112 may generate commands or execute control operations based on information received from the various sensors, including the one or more flex sensors 117, the user interface 118, or the other sensors 119. The one or more processors 112 may also generate commands or execute control operations based upon information received from a combination of the one or more flex sensors 117, the user interface 118, or the other sensors 119. Alternatively, the one or more processors 112 can generate commands or execute control operations based upon information received from the one or more flex sensors 117 or the user interface 118 alone. Moreover, the one or more processors 112 may process the received information alone or in combination with other data, such as the information stored in the memory 113.

The one or more other sensors 119 may include a microphone, an earpiece speaker, a second loudspeaker (disposed beneath speaker port 107), and a user interface component such as a button or touch-sensitive surface. The one or more other sensors 119 may also include key selection sensors, proximity sensors, a touch pad sensor, a touch screen sensor, a capacitive touch sensor, and one or more switches. Touch sensors may used to indicate whether any of the user actuation targets present on the display 105 are being actuated. Alternatively, touch sensors disposed in the electronic device 100 can be used to determine whether the electronic device 100 is being touched at side edges or major faces of the first device housing 102 or the second device housing 103. The touch sensors can include surface and/or housing capacitive sensors in one embodiment. The other sensors 119 can also include audio sensors and video sensors (such as a camera).

The other sensors 119 can also include motion detectors, such as one or more accelerometers or gyroscopes. For example, an accelerometer may be embedded in the electronic circuitry of the electronic device 100 to show vertical orientation, constant tilt and/or whether the electronic device 100 is stationary. The measurement of tilt relative to gravity is referred to as "static acceleration," while the measurement of motion and/or vibration is referred to as "dynamic acceleration." A gyroscope can be used in a similar fashion.

Other components 120 operable with the one or more processors 112 can include output components such as video outputs, audio outputs, and/or mechanical outputs. Examples of output components include audio outputs such as speaker port 107, earpiece speaker, or other alarms and/or buzzers and/or a mechanical output component such as vibrating or motion-based mechanisms. Still other components will be obvious to those of ordinary skill in the art having the benefit of this disclosure.

It is to be understood that FIG. 1 is provided for illustrative purposes only and for illustrating components of one electronic device 100 in accordance with embodiments of the disclosure, and is not intended to be a complete schematic diagram of the various components required for an electronic device. Therefore, other electronic devices in accordance with embodiments of the disclosure may include various other components not shown in FIG. 1, or may include a combination of two or more components or a division of a particular component into two or more separate components, and still be within the scope of the present disclosure. Illustrating by example, the electronic device 100 of FIG. 1 includes a single flexible display 105. By contrast, another embodiment shown below in FIG. 10 includes two separate and distinct displays, and so forth. Additionally, as will be described in more detail below, some embodiments include support plates that are pivotally coupled to a hinge housing of the hinge 101. In other embodiments, these support plates will be omitted.

Turning now to FIG. 2, illustrated therein is the electronic device 100 in a closed state. In this state, the first device housing 102 has been pivoted about the hinge 101 toward the second device housing 103 to a closed position 201. When in the closed position 201, a front surface 202 of the first device housing 102 abuts a front surface 203 of the second device housing 103. Effectively, the first device housing 102 and the second device housing 103 are analogous to clam shells that have been shut by the claim, thereby giving rise to the "clamshell" style of device.

In some embodiments, features can be included to further retain the electronic device 100 in the closed position 201. Illustrating by example, in another embodiment, a mechanical latch can be included to retain the first device housing 102 and the second device housing 103 in the closed position 201. In still another embodiment, magnets can be incorporated into the front surface 202 of the first device housing 102 and the front surface 203 of the second device housing 103. For instance, magnets can be placed in the first device housing 102 and the second device housing 103 to retain the first device housing 102 and the second device housing 103 in the closed position 201. In still other embodiments, frictional elements can be incorporated into the hinge 101 to retain the first device housing 102 and the second device housing 103 in a particular position. A stator motor could be integrated into the hinge 101 as well. Still other mechanical structures and devices suitable for retaining the electronic device 100 in the closed position 201 will be obvious to those of ordinary skill in the art having the benefit of this disclosure.

Turning now to FIG. 3, the electronic device 100 is shown being transitioned from the closed position (201) of FIG. 2 to a partially open position. Specifically, the first device housing 102 is pivoting about the hinge 101 away from the second device housing 103 toward an open position. The position shown in FIG. 3 is a "tent position" 301.

Figures 4, 5:
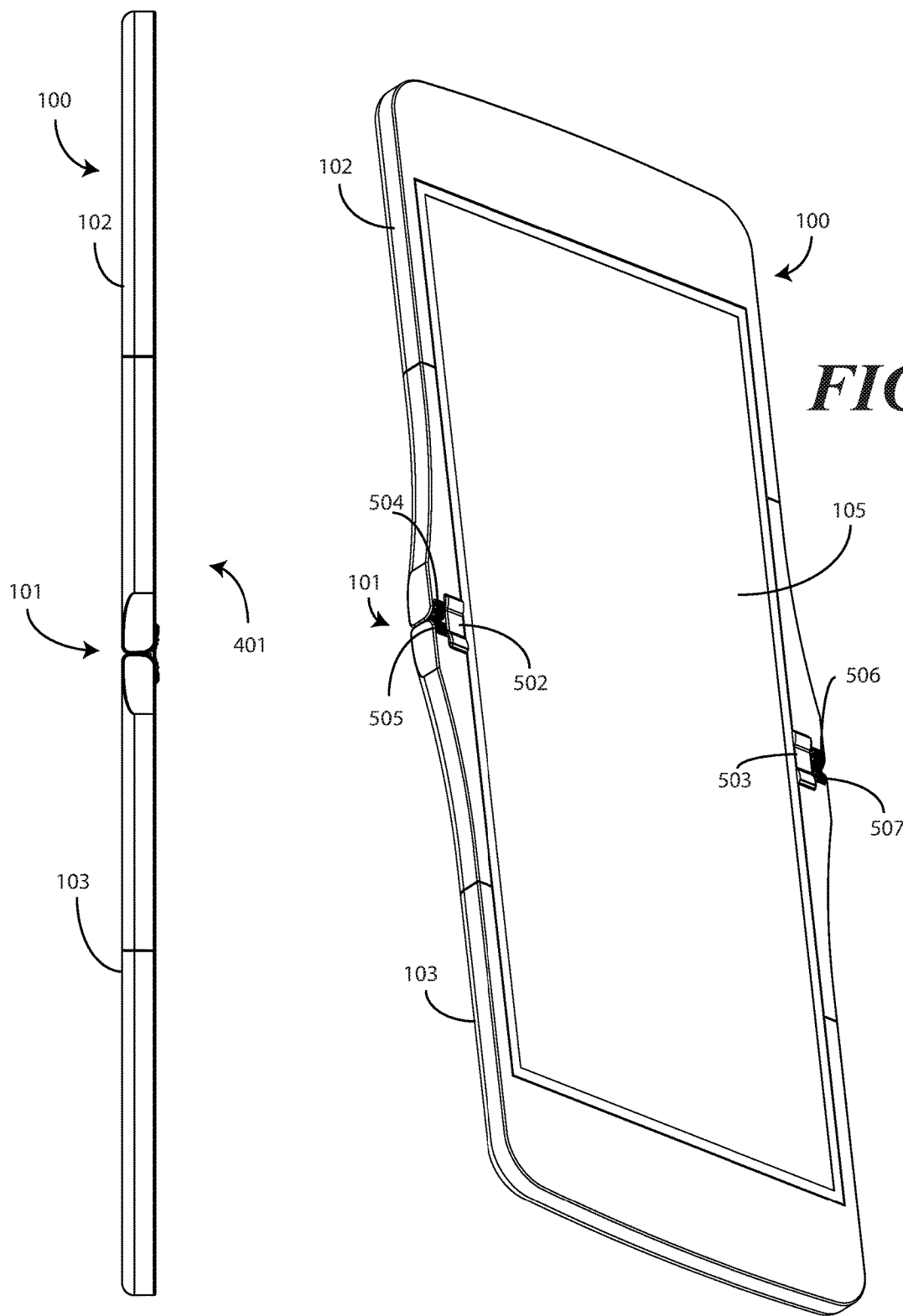
FIG. 4 illustrates a side elevation view of one explanatory electronic device in accordance with one or more embodiments of the disclosure in an open position.
FIG. 5 illustrates a perspective view of one explanatory electronic device in accordance with one or more embodiments of the disclosure in the open position.

Turning now to FIGS. 4 and 5, illustrated therein is the electronic device 100 in an open position 401. In the open position, the first device housing 102 is rotated about the hinge 101 so as to be axially displaced 180-degrees out of phase with the second device housing 103. In such a configuration, the first device housing 102 and the second device housing 103 effectively define a plane. Since this illustrative embodiment includes a flexible display 105, the display 105 has been elongated into a flat position.

With particular attention to FIG. 5, one or more components of the hinge 101 can be seen. As will be described in more detail below, in this illustrative embodiment the hinge 101 includes a hinge housing. A first side 502 of the hinge housing can be seen on one side of the display 105, while a second side 503 of the hinge housing can be seen on another side of the display 105. Optionally, a first toothed wheel 504 and a second toothed wheel 505 can be disposed adjacent to the first side 502 of the hinge housing. Where included, the toothed wheels 504,505 can engage to create a symmetric angular rotation of the first device housing 102 and the second device housing 103 when the first device housing 102 pivots about the hinge 101 relative to the second device housing 103.

In one or more embodiments an optional third toothed wheel 506 and an optional fourth toothed wheel 507 are situated adjacent to the second side 503 of the hinge housing to perform the same function. In this illustrative embodiment, the hinge housing is situated farther interior of the electronic device 100 than are the first toothed wheel 504, the second toothed wheel 505, the third toothed wheel 506, or the fourth toothed wheel 507. Said differently, in this embodiment the hinge housing sits between the engagement of the first toothed wheel 504 and the second toothed wheel 505, and the engagement of the third toothed wheel 506 and the fourth toothed wheel 507.

Turning now to FIG. 6, the electronic device 100 is shown with the flexible display (105), as well as any overlaying fascia, removed so that additional details of the hinge 101 can more readily be seen. As shown in FIG. 6, in one or more embodiments the hinge 101 includes a hinge body 601, which can link the first device housing 102 to the second device housing 103. The hinge body 601 can further include one or more pivots allowing the first device housing 102 to pivot about the hinge 101 relative to the second device housing 103. Optionally, as will be described in more detail below, one or more support plates can be included to translate within the first device housing 102 and the second device housing 103, respectively. The use of such support plates is advantageous when the display used in the electronic device 100 is a flexible display. However, where rigid displays are used, such as in the embodiment of FIG. 10, the support plates can optionally be omitted.

In this illustrative embodiment, a first support plate 602 is pivotally coupled to a first side 605 of the hinge 101. The first support plate 602 extends distally into the first device housing 102 from the first side 605 of the hinge body 601.

A second support plate 603 is then pivotally coupled to a second side 606 of the hinge 101. The second support plate 603 then extends distally into the second device housing 103 from the second side of the hinge body 601.

In one or more embodiments, the first device housing 102 and the second device housing 103 each define linear recesses 608,609 into which a display—be it flexible or not—may be positioned. In one or more embodiments where a flexible display is used, the flexible display is positioned within the linear recess 608 of the first device housing 102 and the linear recess 609 of the second device housing 103 so that it—or a fascia disposed atop the flexible display (105)—sits flush with the interior surface 610 of the first device housing 102 and the interior surface 611 of the second device housing 103. Where a flexible display is used, the flexible display will span the hinge 101.

By contrast, where two displays are used, a first display can be positioned within the linear recess 608 of the first device housing 102. A second display can then be positioned in the linear recess 609 of the second device housing 103. This allows each display—or a fascia disposed atop each display—to sit flush with the interior surface 610 of the first device housing 102 and the interior surface 611 of the second device housing 103. Where two displays are used, the hinge 101 will separate one display from the other.

In still other embodiments, the linear recess 608,609 will be omitted. The display(s), whether flexible or not, as well as any accompanying fascia, may then simply sit atop planar surfaces defined by the interior surface 610 of the first device housing 102 and the interior surface 611 of the second device housing 103.

Where the linear recesses 608,609 are included and a flexible display is used, the flexible display can be positioned within these linear recesses 608,609 to span the hinge 101. Regardless of whether the linear recesses 608,609 are included, when the first device housing 102 pivots about the hinge 101 relative to the second device housing 103 to the axially displaced, open position shown in FIG. 6, the first support plate 602, the hinge body 601, and the second support plate 603 bridge the linear recesses 608,609 (or planar interior surfaces in the other embodiment) to provide positive mechanical support for the flexible display (105).

Where electrical components, e.g., processors, memories, communication circuits, and other components described in the block diagram schematic (111) of FIG. 1 are positioned in each of the first device housing 102 and the second device housing 103, a flexible substrate can be included to electrically couple these components together across the hinge 101, as will be described below with reference to FIGS. 8-9. The flexible substrate, which can bend as the first device housing 102 and the second device housing 103 pivot about the hinge 101 to the closed position (201), allows electrical signals to pass back and forth between circuit components disposed in the first device housing 102 and the second device housing 103.

In one or more embodiments, one or more spring-loaded trays can be included within one or both of the first device housing 102 or the second device housing 103. In the illustrative embodiment of FIG. 6, a tray 604, which is spring loaded and slidable, and which is disposed within the first device housing 102, is visible. It should be noted that while the tray 604 is shown only in the first device housing 102 in this illustrative embodiment, it could be disposed in the second device housing 103 as well. Additionally, in other embodiments both the first device housing 102 and the second device housing 103 could include trays as well.

In one or more embodiments, a first end of the flexible display (105) can be coupled to the second device housing 103. The second end of the flexible display (105) can then be coupled to the tray 604. In one or more embodiments, the tray 604 is slidably coupled to the first device housing 102, and is biased away from the hinge 101 by a spring 607. It should be noted that while a spring 607 is used to bias the tray 604 away from the hinge 101 in this illustrative embodiment, in other embodiments the spring 607 can be replaced by a damper device 612. In one or more embodiments, the damper device 612 comprises a spring with a nested shock damper, which can be pneumatic or hydraulic, to dampen the action of the spring. Other devices suitable for use instead of the spring 607 will be obvious to those of ordinary skill in the art having the benefit of this disclosure.

Once again it should be noted in the discussion of the tray 604 and spring 607 that while only one tray 604 is shown in FIG. 6, the second device housing 103 could likewise include a tray that is slidably coupled to the second device housing 103, and is biased away from the hinge 101 by at least another spring, damper device, or other springy object. In such an embodiment, rather than being coupled to the second device housing 103, the first end of the flexible display (105) could be coupled to the second tray.

In either embodiment, the spring(s) 607 biases the tray 604 away from the hinge 101 to flatten the flexible display (105) when the first device housing 102 pivots about the hinge 101 away from the second device housing 103 to the open position (401). Where a flexible substrate is included, it can have its first end coupled to the second device housing 103, while a second end is coupled to a tray 604. In one or more embodiments, the spring 607 biases the tray 604 away from the hinge 101, and thus away from the second device housing 103, to remove slack from the flexible substrate when the first device housing 102 is pivoted about the hinge 101 toward the second device housing 103 to the closed position (201).

Turning now to FIG. 7, illustrated therein is another view of the electronic device 100 is shown with the first support plate (602) and the second support plate (603) removed so that additional details of the first device housing 102 and the second device housing 103 can more readily be seen. As shown in FIG. 7, in one or more embodiments each of the first device housing 102 and the second device housing 103 define a first chamber 702 and a second chamber 703, respectively. In this illustrative embodiment, the first chamber 702 of the first device housing 102 is disposed to a first side (605) of the hinge 101 and hinge body 601, while the second chamber 703 of the second device housing 103 is disposed to the second side (606) of the hinge 101 and hinge body 601. In this illustrative embodiment, the hinge 101 separates the first chamber 702 defined by the first device housing 102 from the second chamber 703 defined by the second device housing 103.

In one or more embodiments, the first chamber 702 and the second chamber 703 provide recessed, open space within the first device housing 102 and the second device housing 103, respectively, that allows the flexible display (105) room to form a service loop when the first device housing 102 and the second device housing 103 pivot about the hinge 101 to the closed position (201). Such a service loop will be shown below with reference to FIG. 8. This service loop occurs due to the fact that the flexible display (105) deforms when the first device housing 102 pivots about the hinge 101 relative to the second device housing 103 from the axially displaced open position (401) to the closed position (201).

In one or more embodiments, each of the first chamber 702 and the second chamber 703 comprises an inclined plane 704,705. In this illustrative embodiment, the first chamber 702 defines an inclined plane 704 that is disposed distally a predefined distance 706 across a bottom surface 708 of the first chamber 702 from the hinge 101. Similarly, the second chamber 703 defines an inclined plane 705 that is disposed distally a predefined distance 707 across a bottom surface 709 of the second chamber 703 from the hinge 101.

In this illustrative embodiment, the first device housing 102 and the second device housing 103 each define linear recesses 608,609 into which the display may be positioned. In such an embodiment, each of the first chamber 702 and the second chamber 703 is disposed between a respective linear recess 608,609 and the hinge 101. For example, in this illustrative embodiment the first chamber 702 of the first device housing 102 is disposed between the linear recess 608 of the first device housing 102 and the hinge 101. Similarly, the second chamber 703 of the second device housing 103 is disposed between the linear recess 609 of the second device housing 103 and the hinge 101.

Figure 8:
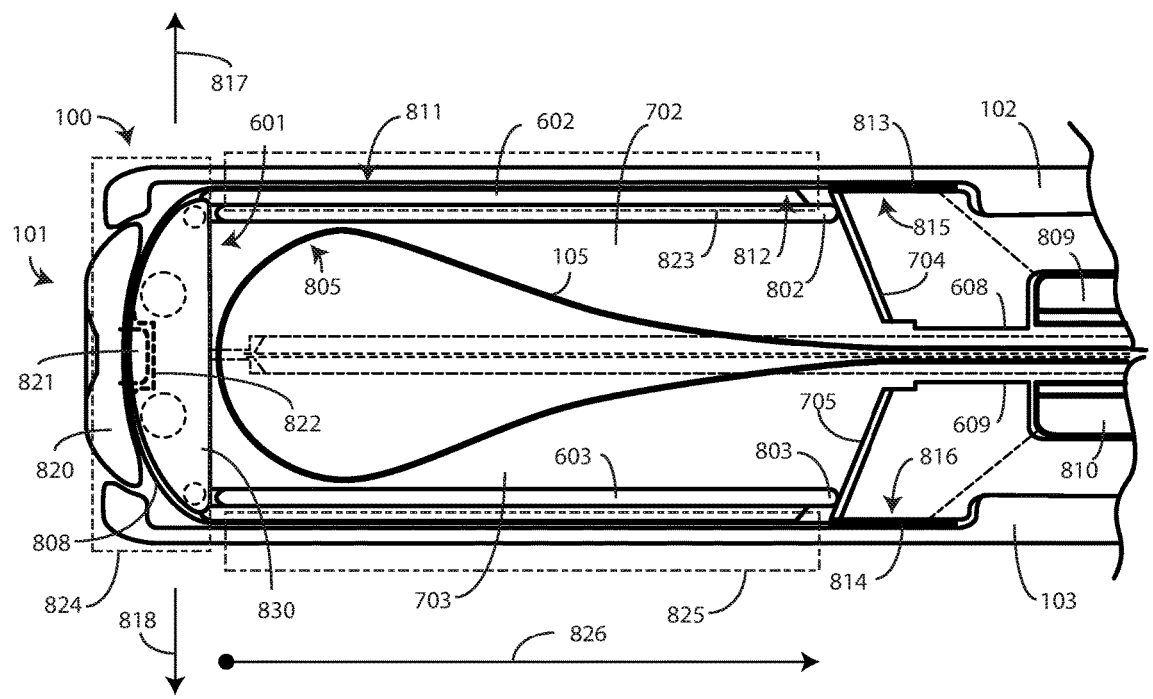
FIG. 8 illustrates a cut away view of a hinge portion of an electronic device in accordance with one or more embodiments of the disclosure when the electronic device is in the closed position.

Turning now to FIG. 8, illustrated therein is a cut away view of the electronic device 100. In this illustration, the flexible display 105 is positioned within the linear recesses 608,609 of the first device housing 102 and the second device housing 103, respectively. As shown, the first device housing 102 defines the first chamber 702, while the second device housing 103 defines the second chamber 703.

As shown in FIG. 8, the first device housing 102 and the second device housing 103 have been pivoted about the hinge 101 to the closed position (201). In one or more embodiments, when this occurs, a distal end 802,803 of each of the first support plate 602 and the second support plate 603 travels along its respective inclined plane 704,705 between a first position (shown in FIG. 9) within the first device housing 102 and the second device housing 103, respectively, to a second position (shown in FIG. 8) within the first device housing 102 and the second device housing 103, respectively.

Figure 9:
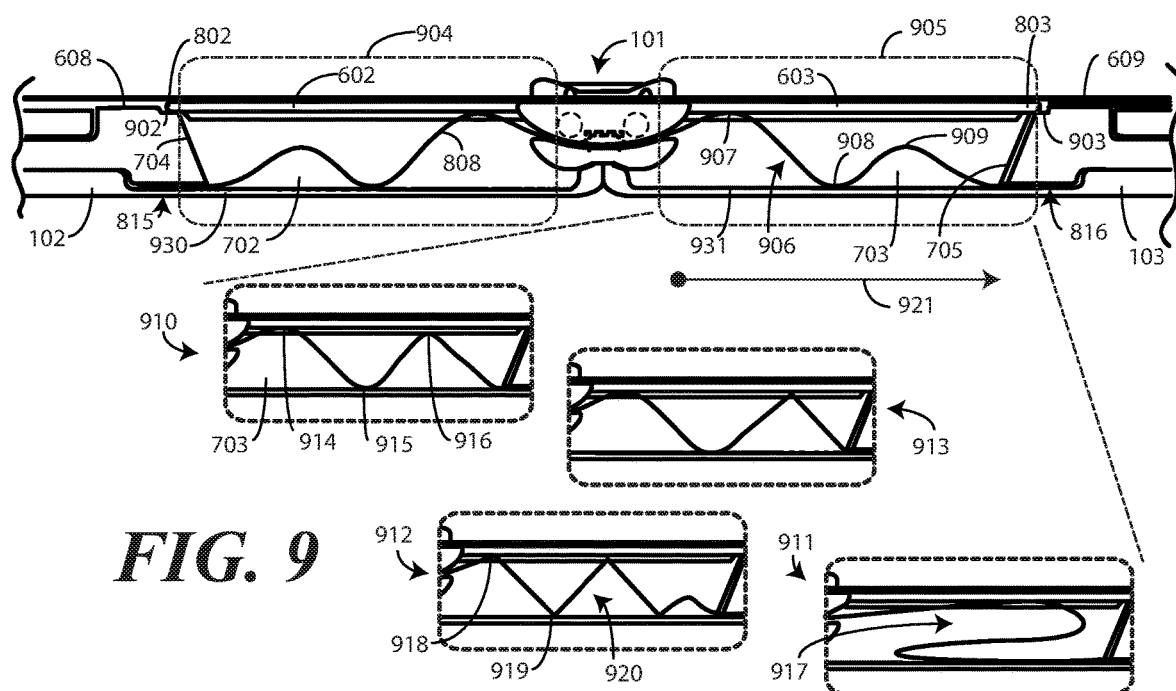
FIG. 9 illustrates a cut away view of a hinge portion of an electronic device in accordance with one or more embodiments of the disclosure when the electronic device is in the open position.

The distal ends 802,803 of each of the first support plate 602 and the second support plate 603 therefore travel, in one or more embodiments, along their respective inclined planes 704,705 through the first chamber 702 and the second chamber 703 between the first position of FIG. 9 within the first device housing 102 and the second device housing 103, respectively, to the second position of FIG. 8 within the first device housing 102 and the second device housing 103, respectively, when the first device housing 102 and the second device housing 103 pivot about the hinge 101 from an axially displaced open position (401) to the closed position (201) of FIG. 8. When this occurs, the first support plate 602, the hinge body 601, and the second support plate 603 define boundaries within which the flexible display 105 defines a service loop 805. The area opened for the service loop 805 by the translation of the first support plate 602 and the second support plate 603, in one embodiment, has a radius of at least five millimeters. Such a radius prevents the flexible display 105 from kinking or folding. It also works to minimize mechanical memory problems when the first device housing 102 and the second device housing 103 pivot about the hinge 101 to the open position (401).

Also shown in FIG. 8 is the flexible substrate 808. In one or more embodiments, the flexible substrate provides a reliable electrical link through the hinge 101 between a first electronic circuit 809 disposed in the first device housing 102 and a second electronic circuit 810 disposed in the second device housing 103. Each of the first electronic circuit 809 and the second electronic circuit 810 can be configured as one or more electrical components, e.g., resistors, capacitors, inductors, integrated circuit chips, and so forth, coupled to a printed circuit board so as to form a printed circuit board assembly.

The first electronic circuit 809 can include a first circuit board, while the second electronic circuit 810 can include a second circuit board, and so forth. In one embodiment, each of the first circuit board and the second circuit board can be manufactured from multiple layers. Some layers can be selectively placed conductive metal, such as copper or aluminum, while other layers can be insulative. Insulative layers can be manufactured from fiberglass, FR4, or other materials. In one or more embodiments, each of the first circuit board and the second circuit board comprises a fiberglass printed circuit board. In another embodiment, each of the first circuit board and the second circuit board is a FR4 printed circuit board.

In the illustrative embodiment of FIG. 8, the flexible substrate 808 passes through the first chamber 702 and the second chamber 703, and further spans the hinge 101, to electrically connect the first electronic circuit 809 to the second electronic circuit 810. In this illustrative embodiment, the flexible substrate 808 spans the hinge 101 by passing between a first portion of the hinge body 601 and a second portion of the hinge body 601. Power (voltage and current), digital signals, analog signals, common nodes (e.g., ground or Vcc), and other electrical connections can be made by electrically coupling the flexible substrate 808 to both the first electronic circuit 809 and the second electronic circuit 810.

In one embodiment, the flexible substrate 808 comprises flexible copper conductors encapsulated in a flexible insulative material. One example of such an insulative material is Kapton.sup.TM manufactured by DuPont. The flexible substrate 808, in addition to having flexible conductors running within the substrate, may also have conductive pads and traces atop the substrate for coupling to the printed circuit boards or other electrical connections of the first electronic circuit 809 and the second electronic circuit 810, respectively.

In one or more embodiments, the flexible substrate 808 includes a first major face 811 and a second major face 812. Components can optionally be coupled to either of the first major face 811 or the second major face 812. Alternatively, the first major face 811 and/or second major face 812 may simply couple to other substrates, such as the printed circuit boards of the first electronic circuit 809 or the second electronic circuit 810. In still further embodiments, the first major face 811 and the second major face 812 can be coated with special coatings, structural reinforcements, metal traces for shielding purposes, or other features. Still other configurations for the first major face 811 and the second major face 812 will be obvious to those of ordinary skill in the art having the benefit of this disclosure.

In one or more embodiments, when the first device housing 102 and the second device housing 103 pivot about the hinge 101 from an axially displaced open position (401) to the closed position (201) of FIG. 8, this mechanical operation applies forces to the flexible substrate 808. In the illustrative embodiment of FIG. 8, the flexible substrate 808 includes, and extends between, a first end 813 and a second end 814. In one or more embodiments, the first end 813 is fixedly coupled at a first location 815 within the first device housing 102. Similarly, the second end 814 is fixedly coupled at a second location 816 within the second device housing 103.

With the first end 813 and the second end 814 fixed at the first location 815 and the second location 816, respectively, when the first device housing 102 pivots about the hinge 101 relative to the second device housing 103 to the closed position (201), this causes the first location 815 to separate from the second location 816 as the distance is measured through the path taken by the flexible substrate 808. In this illustrative embodiment, the movement of the first location 815 away from the second location 816, and thus the first end 813 away from the second end 814, causes the flexible substrate 808 to remove deformations from a deformed state between the first location 815 and the second location 816. Said differently, the flexible substrate 808 is becomes less slack about the hinge 101 when the first device housing 102 and the second device housing 103 are pivoted about the hinge 101 to the closed position (201) in this illustrative embodiment.

In this particular embodiment, the flexible display 105 is included, as are the first support plate 602 and the second support plate 603. As described above, the first support plate 602 is pivotally coupled to a first side 817 of the hinge body 601. The first support plate 602 extends distally into the first chamber 702 from the first side 817 of the hinge body 601. Similarly, the second support plate 603 is pivotally coupled to a second side 818 of the hinge body 601. The second support plate 603 extends distally into the second chamber 703 from the second side 818 of the hinge body 601. The distal end 802 of the first support plate 602 and the distal end 803 of the second support plate 603 each travel along its respective inclined plane 704,705 between a first position within the first chamber 702 and the second chamber 703, respectively, as shown in FIG. 9, to a second position within the first chamber 702 and the second chamber 703, respectively, as shown in FIG. 8, when the first device housing 102 and the second device housing 103 pivot about the hinge 101 from the axially displaced open position (401) to the closed position (201).

The translation of the first support plate 602 and the second support plate 603 along the inclined planes 704,705 from a shallow position (FIG. 9) within the first device housing 102 and the second device housing 103, to the deep position within the first device housing 102 and the second device housing 103 shown in FIG. 8, when the first device housing 102 pivots about the hinge 101 relative to the second device housing 103 from the axially displaced open position (401) to the closed position (201) results in the first support plate 602 and the second support plate 603 abutting the second major face 812 of the flexible substrate 808 when the first device housing 102 and the second device housing 103 are in the closed position (201).

Turning now to FIG. 9, the first device housing 102 and the second device housing 103 have been rotated about the hinge 101 to the axially displaced open position (401). When this occurs, due to the action of the hinge body 601, the distal ends 802,803 of the first support plate 602 and the second support plate 603 translate up their respective inclined planes 704,705, through the first chamber 702 and the second chamber 703, from the second position of FIG. 8 to the first position shown in FIG. 9. In the illustrative embodiment of FIG. 9, when the distal ends 802,803 of the first support plate 602 and the second support plate 603 fully translate up their respective inclined planes 704,705 from the second position of FIG. 8 to the first position shown in FIG. 9, they sit atop ends 902,903 of the inclined planes 704,705.

In this position, and as shown in FIG. 9, when the distal ends 802,803 of the first support plate 602 and the second support plate 603 fully translate up their respective inclined planes 704,705 from the second position of FIG. 8 to the first position shown in FIG. 9, the first support plate 602, the hinge body 601, and the second support plate 603 bridge the linear recess 608 of the first device housing 102 and the linear recess 609 of the second device housing 103 when the first device housing 102 and the second device housing 103 are in an axially displaced open position shown in FIG. 9.

In one or more embodiments, when the first device housing 102 and the second device housing 103 pivot about the hinge 101 from the closed position (201) to the axially displaced open position (401) of FIG. 9, this mechanical operation applies forces to the flexible substrate 808 by shortening the distance between the first location 815 and the second location 816. In one or more embodiments, when this occurs, i.e., the flexible substrate 808 deforms to a deformed state as shown in FIG. 9.

In FIG. 9, when the first device housing 102 and the second device housing 103 pivot about the hinge 101 from the closed position (201) to the axially displaced open position (401), the first chamber 702 is situated between the first location 815 and the hinge 101. Similarly, when the first device housing 102 and the second device housing 103 pivot about the hinge 101 from the closed position (201) to the axially displaced open position (401), the second chamber 703 is situated between the second location 816 and the hinge 101. Since the distal ends 802,803 of the first support plate 602 and the second support plate 603 have translated up their respective inclined planes 704,705 from the second position of FIG. 8 to the first position shown in FIG. 9, the first support plate 602, the second support plate 603, and the hinge body 601 work in tandem to mechanically support the flexible display 105.

Moreover, translation of the first support plate 602 and the second support plate 603 to the first position shown in FIG. 9 creates a dynamic region 904 in the first chamber 702 and another dynamic region 905 in the second chamber 703 within which the flexible substrate 808 can deform. As shown in FIG. 9, in one or more embodiments the flexible substrate 808 defines a curvilinear shape 906 in one or both of the first dynamic region 904 of the first chamber 702 and/or the second dynamic region 905 of the second chamber 703 when the first device housing 102 and the second device housing 103 are pivoted about the hinge 101 to the axially displaced open position (401).

In this illustrative embodiment, the curvilinear shape 906 defines at least a partially oscillating shape that defines at least one apex 907 and at least one nadir 908. In the illustrative embodiment of FIG. 9, the at least partially oscillating shape is a dampened curvilinear wave, with apexes 909 farther from the hinge 101 having lower amplitudes than apexes 907 near the hinge 101.

In one or more embodiments, the first chamber 702 and the second chamber 703 can each have an upper surface and a lower surface that limit an amplitude of the at least one apex 907 and the depth of the at least one nadir 908. In this illustrative embodiment, the lower surfaces 930,931 comprise portions of the first device housing 102 and the second device housing 103, while the upper surfaces are defined by the first support plate 602 and the second support plate 603. In other embodiments, as will be described below with reference to FIG. 11, the upper surface and the lower surface of the first chamber 702 can comprise portions of the first device housing 102, while the upper surface and the lower surface of the second chamber 703 comprise portions of the second device housing 103.

In this illustrative embodiment, the nadir 908 is bounded, or limited, by the lower surfaces 930,931 of the first chamber 702 and the second chamber 703, respectively, while the apex 907 closest to the hinge 101 is bounded, or limited, by the first support plate 602 and the second support plate 603, respectively. Thereafter, the next closest apex 909 extends from the lower surfaces 930,931 of the first chamber 702 and second chamber 703, respectively, but avoids contact with the first support plate 602 and the second support plate 603, respectively.

While this is one possible deformation for the flexible substrate 808, embodiments of the disclosure are not so limited. In another embodiment 910, the curvilinear shape 906 defines at an oscillating shape that again defines at least one apex 914 and at least one nadir 915. In this embodiment 910, the oscillating shape is a curvilinear shape having apexes 916 farther from the hinge 101 with common amplitudes with apexes 914 near the hinge 101, as both are bounded by the first support plate 602 and the second support plate 603, respectively. Similarly, each nadir 915 has a common low point due to the fact that they are each bounded by the lower surfaces 930,931 of the first chamber 702 and the second chamber 703, respectively.

In another embodiment 911, rather than defining an oscillatory wave shape or partially oscillatory shape extending along a line parallel to the flexible display 105, the curvilinear shape 906 is a vertically oriented oscillatory shape 917 extending along a line that is orthogonal or substantially orthogonal with the plane defined by the flexible display 105. In still another embodiment 912, where sections 918 of the flexible substrate 808 are configured to be stiffer than other portions 919 of the flexible substrate 808, the flexible substrate 808 can deform into substantially piecewise linear shape 920 with sections 918 of the flexible substrate 808 that are configured to be stiffer being substantially straight, while bends occur in other portions 919 of the flexible substrate 808.

In still another embodiment 913, a combination of curvilinear and piecewise linear shapes can result due to the deformation. Depending upon the dimensions of the first chamber 702 and the second chamber 703, the distance between the first location 815 and the second location 816, the length of the flexible substrate 808, and the physical configuration of the flexible substrate 808, other shapes can occur due to deformation as well. Additionally, while the deformation is shown as being substantially symmetrical about the hinge 101 in FIG. 9, in other embodiments the deformation will be asymmetrical. Deformation may be greater to the left of the hinge 101 or to the right of the hinge 101.

Turning now back to FIG. 8, in one or more embodiments the hinge body 601 comprises a pivot cover 830 that is coupled to a backer 820. Each of the pivot cover 830 and the backer 820 can be a piece of plastic or metal. In one or more embodiments, the pivot cover 830 and the backer 820 abut and can be attached together such that the flexible substrate 808 passes between the backer 820 and the pivot cover 830. In one embodiment, the backer 820 includes a mechanical feature 821, which can be a snap, latch, male protrusion, or female receiver, which engages a complementary mechanical feature 822 of the pivot cover 830 to keep the backer 820 in a constant position or alignment relative to the pivot cover 830 when the first device housing 102 pivots about the hinge 101 relative to the second device housing 103.

In one or more embodiments, the inclusion of a backer 820 attached to the pivot cover 830 keeps the flexible substrate 808 centrally located between the first location 815 and the second location 816, as well as fixedly located within the hinge body 601. In other embodiments, even where a backer 820 is included, the flexible substrate 808 is allowed to translate freely between the backer 820 and the pivot cover 830 when the first device housing 102 pivots about the hinge 101 relative to the second device housing 103. The backer 820 and/or pivot cover 830 can advantageously include one or more mechanical features that allow portions of the first device housing 102 and the second device housing 103 to engage to retain each in the axially displaced open position (401), as shown in FIG. 9. In other embodiments, the hinge body 601 will be a unitary part without a separate backer 820.

As best seen in FIG. 8, in one or more embodiments where the first end 813 of the flexible substrate 808 is anchored within the first device housing 102 at the first location 815, and where the second end 814 of the flexible substrate is anchored within the second device housing 103 at the second location 816, the flexible substrate defines a first dynamic region 823 and a second dynamic region 825. In one embodiment, the first dynamic region 823 is defined between the first location 815 and the hinge body 601, while the second dynamic region 825 is defined between the second location 816 and the hinge body 601. A hinge-spanning region 824, where the flexible substrate 808 spans the hinge body 601, is then defined between the first dynamic region 823 and the second dynamic region 825.

By comparing FIG. 8 to FIG. 9, it can be seen that in one or more embodiments the first dynamic region 823 and the second dynamic region 825 deform to a deformed state when the first device housing 102 pivots about the hinge 101 from the closed position (201) shown in FIG. 8 to the axially displaced open position (401) shown in FIG. 9. The first dynamic region 823 and the second dynamic region 825 extending a first distance 826 between the hinge body 601 and the first location 815 and the second location 816, respectively, when the first device housing 102 and the second device housing 103 pivot about the hinge 101 from the axially displaced open position (401) of FIG. 9 to the closed position (201) of FIG. 8. By contrast, the first dynamic region 823 and the second dynamic region 825 extend a second distance 921 between the hinge body 601 and the first location 815 and the second location 816, respectively, when the first device housing 102 and the second device housing 103 pivot about the hinge 101 from the closed position (201) of FIG. 8 to the axially displaced open position (401) of FIG. 9. In the illustrative embodiment of FIGS. 8-9, the second distance 921 is less than the first distance 826, which results in the deformation of the first dynamic region 823 of the flexible substrate 808 and the second dynamic region 825 of the flexible substrate 808 into the deformed state shown in FIG. 9.

In this illustrative embodiment, both the first dynamic region 823 and the second dynamic region 825 deform by transitioning from a substantially straight shape, shown in FIG. 8, to a curvilinear shape, shown in FIG. 9. Where the deformation is unsymmetrical, only one of the first dynamic region 823 or the second dynamic region 825 may deform by transitioning from a substantially straight shape to a curvilinear shape, as noted above. Additionally, where the deformation is unsymmetrical, the first dynamic region 823 may deform more than the second dynamic region 825, or vice versa, when the flexible substrate 808 is in the deformed state.

In FIG. 8, the flexible substrate 808 spans an interior portion of the hinge body 601 between the backer 820 and the pivot cover 830. In FIG. 9, the flexible display 105 spans an outer (upward as viewed in FIG. 9) side of the hinge body 601. Thus, in this illustrative embodiment, the flexible display 105 spans a first side of the pivot cover 830, while the flexible substrate 808 spans a second side of the pivot cover 830. As will be shown in more detail below with reference to FIG. 15, in other embodiments the flexible substrate 808 can pass through an interior channel defined through the hinge body 601, while the flexible display 105 spans an exterior side of the hinge body 601. Other configurations for the flexible display 105 and the flexible substrate 808 will be obvious to those of ordinary skill in the art having the benefit of this disclosure.

Figure 10:
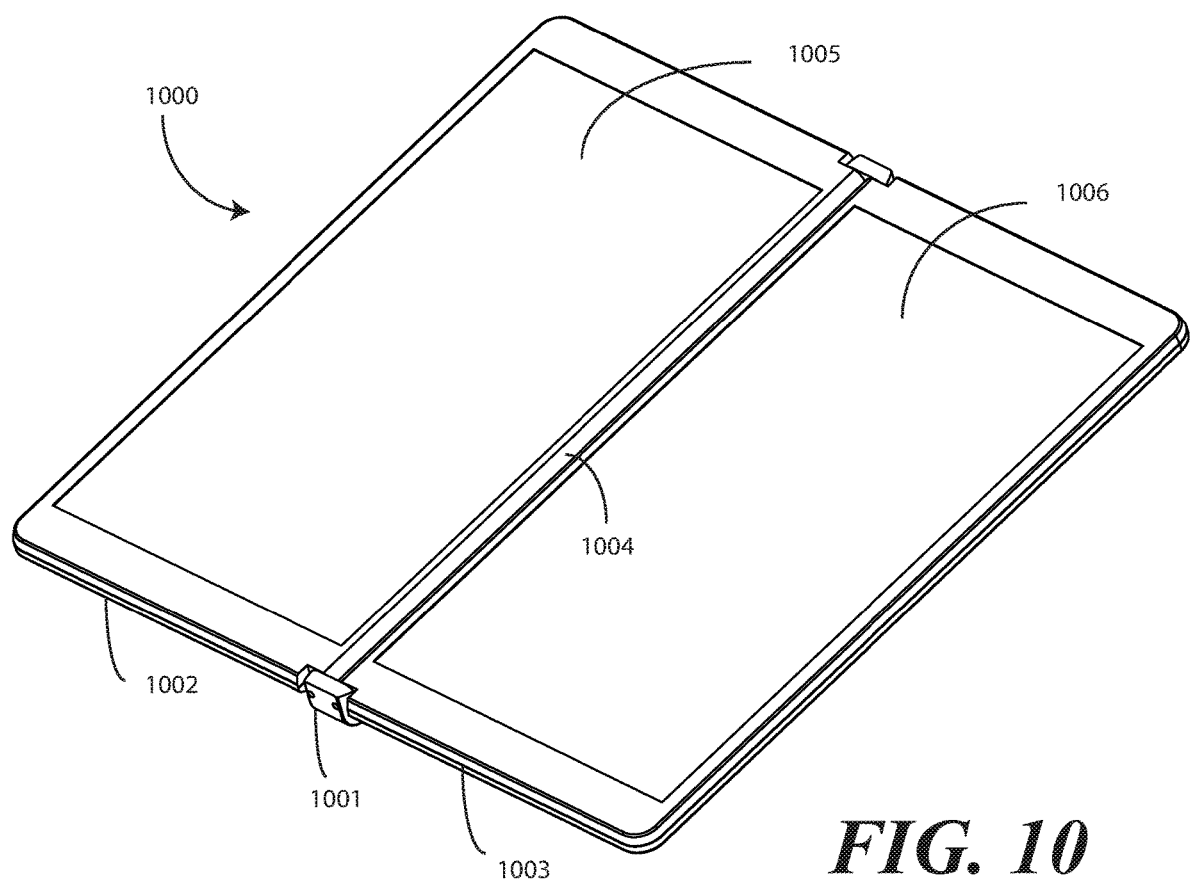
FIG. 10 illustrates a perspective view of another explanatory electronic device in accordance with one or more embodiments of the disclosure in the open position.

As noted above, the dynamic changes in shape and length of the flexible substrate 808 allow the flexible substrate 808 to deform by taking on more slack between the first location 815 and the second location 816. This deformation can occur to either side, i.e., to the right and/or to the left, of the hinge 101. This deformation to either side of the hinge 101 is in contrast to prior art designs where deformation occurs within the hinge 101. The dynamic changes in shape and length can occur regardless of whether a flexible display 105 is included. The dynamic changes in shape and length can further occur regardless of whether first support plate 602 and the second support plate 603 are included. Turning now to FIG. 10, illustrated therein is one embodiment where the flexible display and support plates are omitted.

As shown in FIG. 10, an electronic device 1000 includes a first device housing 1002 and a second device housing 1003. A hinge 1001, which comprises a hinge body 1004, couples the first device housing 1002 to the second device housing 1003. The first device housing 1002 is pivotable about the hinge 1001 relative to the second device housing 1003 between an axially displaced open position and a closed position, as previously described.

Rather than having a flexible display, in this embodiment the electronic device 1000 includes a first display 1005 coupled to the first device housing 1002 and a second display 1006 coupled to the second device housing 1003. Thus, in addition to separating the first device housing 1002 from the second device housing 1003, the hinge 1001 separates the first display 1005 from the second display 1006 as well.

Figure 11:
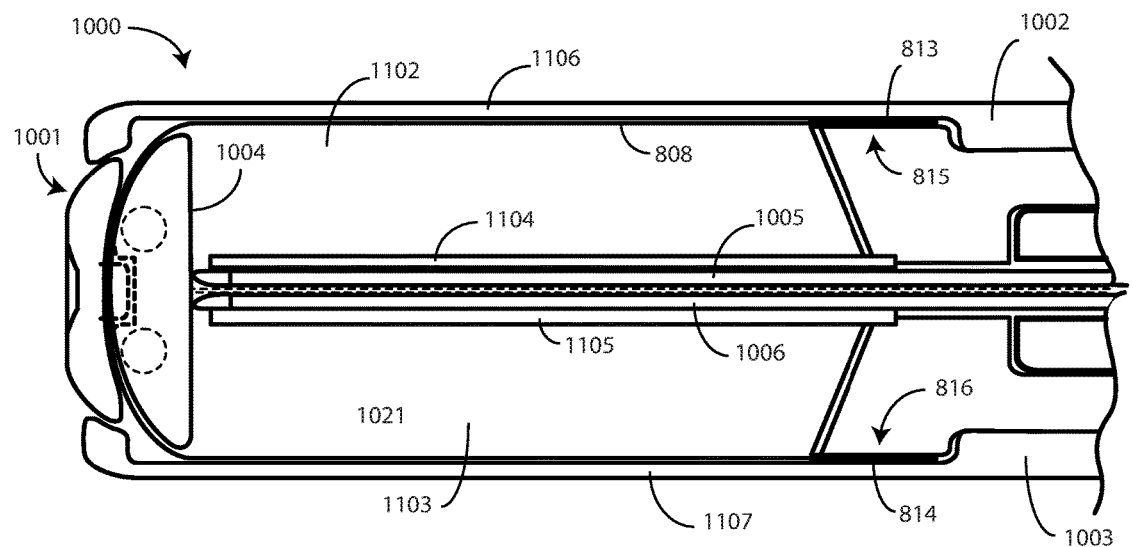
FIG. 11 illustrates a cut away view of a hinge portion of another electronic device in accordance with one or more embodiments of the disclosure when the electronic device is in the closed position.

Turning now to FIG. 11, illustrated therein is a cut away view of the electronic device 1000. In this illustration, the first display 1005 and the second display 1006 face each other, and can even abut, when the first device housing 1002 and the second device housing 1003 pivot about the hinge 1001 to the closed position shown in FIG. 11.

As before, the first device housing 1002 defines the first chamber 1102, while the second device housing 1003 defines the second chamber 1103. In this illustrative embodiment, the first chamber 1102 and the second chamber 1103 each having an upper surface 1104,1105 and a lower surface 1106,1107. As before, the upper surfaces 1104,1105 and lower surfaces 1106,1107 of the first chamber 1102 and the second chamber 1103 can function to limit an amplitude of at least one apex and a depth of at least one nadir formed in the flexible substrate 808.

In this illustrative embodiment, the upper surface 1104 and the lower surface 1106 of the first chamber 1102 comprise portions of the first device housing 1002. Similarly, in this illustrative embodiment the upper surface 1105 and the lower surface 1107 of the second chamber 1103 comprise portions of the second device housing 1003. These portions can be physical walls or surfaces that are integrally formed into the first device housing 1002 and second device housing 1003, respectively. Illustrating by example, where the first device housing 1002 and the second device housing 1003 are formed from plastic using an injection molding process, the upper surfaces 1104,1105 and lower surfaces 1106,1107 can be formed as walls in the parts defining the first device housing 1002 and second device housing 1003. Other techniques for integrating the upper surfaces 1104, 1105 and lower surfaces 1106,1107 into the first device housing 1002 and the second device housing 1003 will be obvious to those of ordinary skill in the art having the benefit of this disclosure.

In this embodiment, a hinge body 1004 of the hinge 1001 is still present. However, since the first display 1005 and the second display 1006 are rigid displays in this embodiment, the support plates have been omitted. In other embodiments, the support plates (602,603) of FIGS. 8-9 could still be included despite the fact that the first display 1005 and the second display 1006 are rigid displays. Where included, the upper surfaces 1104,1105 of the first chamber 1102 and the second chamber 1103 can be omitted.

As shown in FIG. 11, the flexible substrate 808 spans an interior of the hinge body 1004. As before, the flexible substrate 808 includes a first end 813 anchored within the first device housing 1002 at a first location 815. The flexible substrate 808 also includes a second end 814 that is anchored within the second device housing 1003 at a second location 816.

Figure 12:
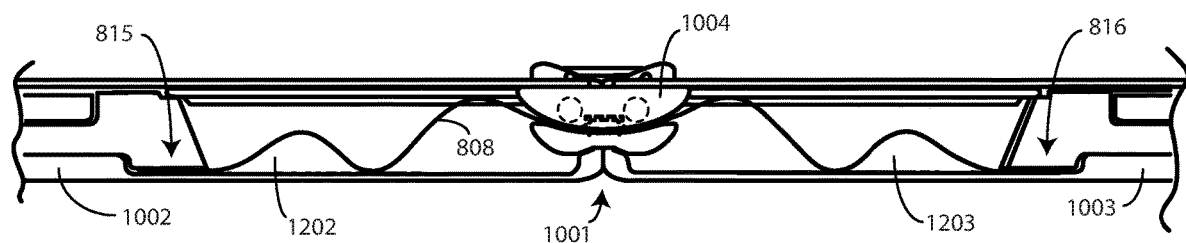
FIG. 12 illustrates a cut away view of a hinge portion of another electronic device in accordance with one or more embodiments of the disclosure when the electronic device is in the open position.

In FIG. 11, the first device housing 1002 and the second device housing 1003 have been pivoted about the hinge 1001 to the closed position. This causes a reduction in slack in the flexible substrate 808. By contrast, turning now to FIG. 12, when the first device housing 1002 is pivoted about the hinge 1001 to the axially displaced open position, slack is increased in the flexible substrate 808 between the first location 815 and the second location 816. In this illustrative embodiment, the flexible substrate 808 is more slack between the first location 815 and the hinge body 1004, and the second location 816 and the hinge body 1004, respectively, when the first device housing 1002 and the second device housing 1003 pivot to the axially displaced open position due to the fact that the first device housing 1002 and the second device housing 1003 each define a dynamic chamber 1202,1203 within which the flexible substrate 808 can deform. By contrast, the flexible substrate 808 is less slack between the first location 815 and the hinge body 1004, and the second location 816 and the hinge body 1004, respectively, when the first device housing 1002 and the second device housing 1003 pivot to the closed position due to the fact that the first location 815 and the second location 816 each move further from the locations at which the flexible substrate 808 exits the hinge body 1004 and enters the corresponding dynamic chamber 1202,1203 of the first device housing 1002 and the second device housing 1003.

Figure 13:
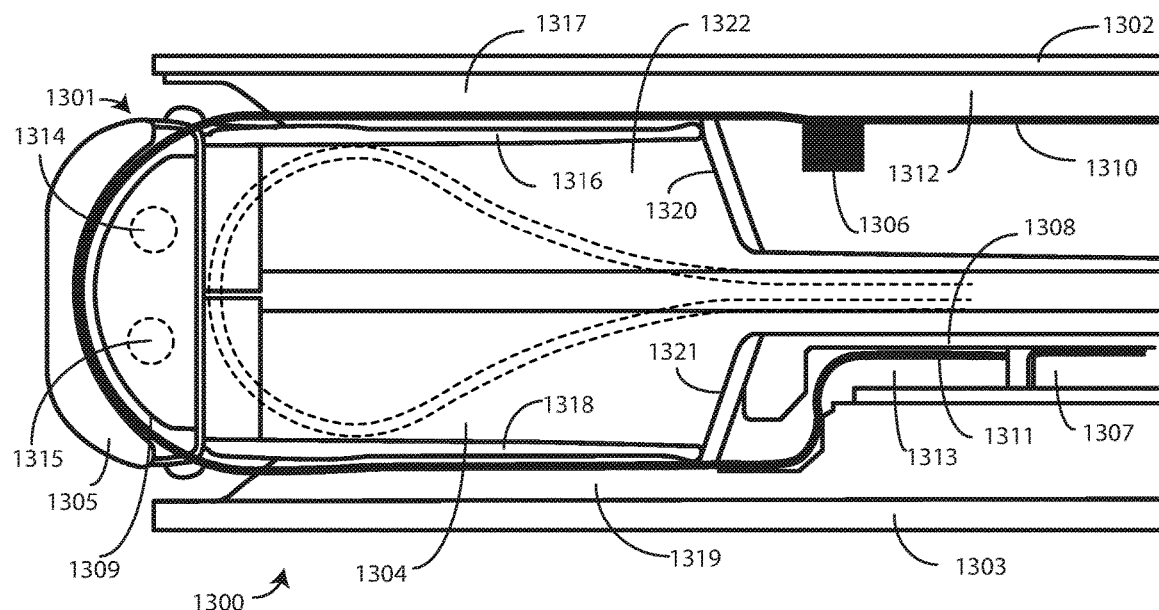
FIG. 13 illustrates a cut away view of a hinge portion of yet another electronic device in accordance with one or more embodiments of the disclosure when the electronic device is in the closed position.

Turning now to FIG. 13, illustrated therein is a cut away view of yet another electronic device 1300. The electronic device 1300 includes a first device housing 1302 and a second device housing 1303. A hinge 1301 movably joins the first device housing 1302 to the second device housing 1303. The first device housing 1302 defines a first chamber 1322, while the second device housing 1303 defines a second chamber 1304. A hinge body 1305 of the hinge 1301 separates both the first device housing 1302 from the second device housing 1303 and the first chamber 1322 from the second chamber 1304.

The first device housing 1302 and the second device housing 1303 are pivoted about the hinge 1301 to a closed position. A flexible substrate 1308 provides an electrical conduit through the hinge 1301 between a first electronic circuit element 1306 disposed in the first device housing 1302 and a second electronic circuit element 1307 disposed in the second device housing 1303.

The flexible substrate 1308 passes through the first chamber 1322 and the second chamber 1304. The flexible substrate 1308 also spans the hinge 1301 by passing through a channel 1309 defined in the hinge body 1305. Power, digital signals, analog signals, common nodes, and other electrical connections can be made by electrically coupling the flexible substrate 1308 to both the first electronic circuit element 1306 and the second electronic circuit element 1307.

The flexible substrate 1308 includes end regions 1310, 1311 that are mechanically fixed to a first location 1312 in the first device housing 1302 and a second location 1313 in the second device housing 1303, respectively. The portions of the flexible substrate 1308 passing through the first chamber 1322 and the second chamber 1304 each define dynamic or movable regions between the first location 1312 and the hinge body 1305 and the second location 1313 and the hinge body 1305, respectively. A middle region of the flexible substrate 1308 passes through the channel 1309 of the hinge body 1305. As shown in FIG. 13, the middle region is between the two dynamic regions.

In this illustrative embodiment, as with previous embodiments, the hinge body 1305 defines a first axis of rotation 1314 about which the first device housing 1302 and the hinge body 1305 rotate relative to each other. The hinge body 1305 also defines a second axis of rotation 1315 about which the second device housing 1303 and the hinge body 1305 rotate relative to each other. Accordingly, the hinge body 1305 movably joins the first device housing 1302 and the second device housing 1303 at the first axis of rotation 1314 and the second axis of rotation 1315.

In one or more embodiments, the first chamber 1322 defines a first surface 1316 and a second surface 1317. In this embodiment, the first surface 1316 comprises a movable support plate pivotally coupled to the hinge body 1305, while the second surface 1317 comprises a portion of the first device housing 1302. In similar fashion, the second chamber 1304 defines a first surface 1318 and a second surface 1319. The first surface 1318 is a movable support plate pivotally coupled to the hinge body 1305, while the second surface 1319 comprises a portion of the second device housing 1303. As arranged in FIG. 13, the flexible substrate 1308 resides between the first surface 1316 and the second surface 1317 of the first chamber 1322. The flexible substrate 1308 also resides between the first surface 1318 and the second surface 1319 of the second chamber 1304.

The portions of the flexible substrate 1308 passing through the first chamber 1322 and the second chamber 1304 each define dynamic regions. A distal end of the first surface 1316 of the first chamber 1322, shown here as a first support plate, and a distal end of the first surface 1318 of the second chamber 1304, shown here as a second support plate, each travel along an inclined plane 1320,1321 between a first position within the first chamber 1322 and the second chamber 1304, respectively, to a second position within the first chamber 1322 and the second chamber 1304, respectively, as previously described when the first device housing 1302 and the second device housing 1303 pivot about the hinge 1301 from the closed position to an axially displaced open position as previously described.

The translation of the first support plate and the second support plate causes the distance between the first surfaces 1316,1318 and the second surfaces 1317,1319 of the first chamber 1322 and the second chamber 1304 to separate. In one or more embodiments, the dynamic regions of the flexible substrate 1308 then translate from a flat shape to a curvilinear shape as the first device housing 1302 and second device housing 1303 move apart about their axes of rotation 1314,1315. In one or more embodiments, the first surfaces 1316,1318 and the second surfaces 1317,1319 of the first chamber 1322 and the second chamber 1304 control the upper and lower limits of the curvilinear shapes of the dynamic regions of the flexible substrate 1308. The hinge body 1305, and in particular the channel 1309 within the hinge body 1305, can control the position of the middle region of the flexible substrate between the first device housing 1302 and the second device housing 1303 in one or more embodiments.

Figure 14:
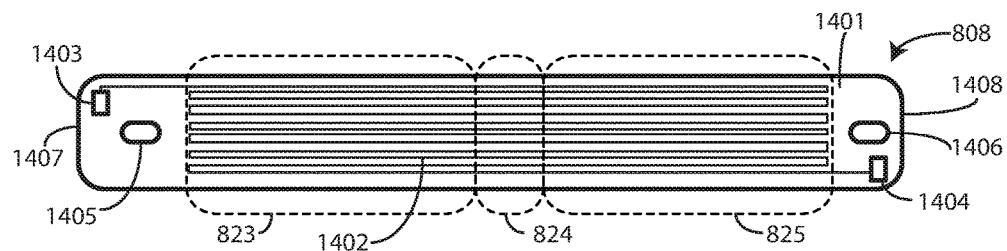
FIG. 14 illustrates one explanatory flexible substrate in accordance with one or more embodiments of the disclosure.

Turning now to FIG. 14, illustrated therein is one illustrative flexible substrate 808 configured in accordance with one or more embodiments of the disclosure. In one or more embodiments, the flexible substrate 808 comprises one or more layers of insulative material 1401, which can encapsulate one or more conductive electrical traces 1402 sandwiched between the one or more layers of insulative material 1401. One or more conductive electrical pads 1403,1404 can be exposed in the insulative material 1401. The one or more conductive electrical traces 1402 can couple a first conductive pad 1403 to a second conductive pad 1404, and so forth. For illustration purposes, the one or more conductive electrical traces 1402 are shown as passing back and forth between the conductive electrical pads 1403,1404 in a serpentine fashion. This is illustrative only so as to convey that many electrical traces can be arranged as required by a particular application between the one or more layers of insulative material 1401. The flexible substrate 808 can include one or more apertures 1405,1406 or other mechanical features that allow the first end 1407 and second end 1408 of the flexible substrate 808 to be anchored within a device housing.

In this illustrative embodiment, the flexible substrate 808 is configured as a rectangle having a length of about seventy-two millimeters and a width of about twelve millimeters. The rectangular shape is illustrative only, as the flexible substrate 808 could be configured in a myriad of other shapes as needed by application.

In this illustrative embodiment, the flexible substrate defines a first dynamic region 823 and a second dynamic region 825. A hinge-spanning region 824 separates the first dynamic region 823 and the second dynamic region 825. In this illustrative embodiment, the collective width of the first dynamic region 823, the second dynamic region 825, and the hinge-spanning region 824 is about fifty millimeters.

Figure 15:
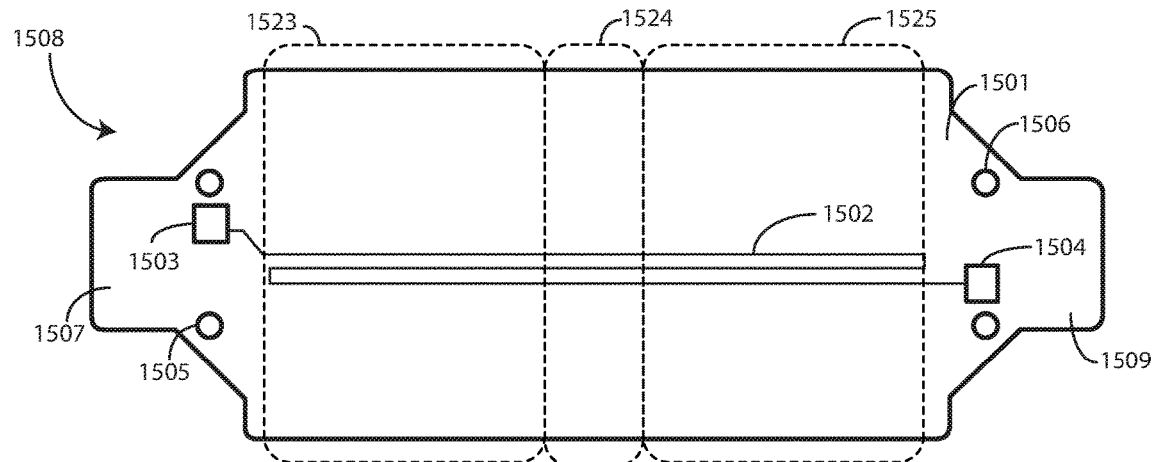
FIG. 15 illustrates another explanatory flexible substrate in accordance with one or more embodiments of the disclosure.

Turning now to FIG. 15, illustrated therein is another illustrative flexible substrate 1508 configured in accordance with one or more embodiments of the disclosure. One or more layers of insulative material 1501 encapsulate one or more conductive electrical traces 1502 in a sandwiched format. In one embodiment, the one or more layers of insulative material 1501 encapsulate a single layer of one or more conductive electrical traces 1502 in a sandwiched format. However, in other embodiments, the one or more layers of insulative material 1501 will include a plurality of layers of insulative material so as to encapsulate multiple layers of conductive electrical traces. Other configurations for the flexible substrate 1508 will be obvious to those of ordinary skill in the art having the benefit of this disclosure. In one or more embodiments, one or more conductive electrical pads 1503,1504 can be exposed in the insulative material 1501, and can be coupled electrically by the one or more conductive electrical traces 1502. The flexible substrate 1508 can include one or more apertures 1505,1506 or other mechanical features that allow the first end 1507 and second end 1509 of the flexible substrate 1508 to be anchored within a device housing.

In this illustrative embodiment, the flexible substrate 1508 is configured as a double-tapering polygon having a length of between seventy-three millimeters and seventy-four millimeters, and a width of about twenty-seven millimeters. The first end 1507 and the second end 1509 are narrower than is the movable region, which includes a first dynamic region 1523, a hinge spanning region 1524, and a second dynamic region 1525. In this embodiment, the movable region has a length of between fifty-one and fifty-two millimeters. The double-tapering polygon includes a generally rectangular shape for the movable region, bounded at each end by a frustoconical tapering portion. The frustoconical tapering portions are then bounded by the generally rectangular first end 1507 and second end 1509. This double-tapering polygon illustrates the fact that flexible substrates configured in accordance with embodiments of the disclosure can be configured in a variety of different shapes.

Figure 16:
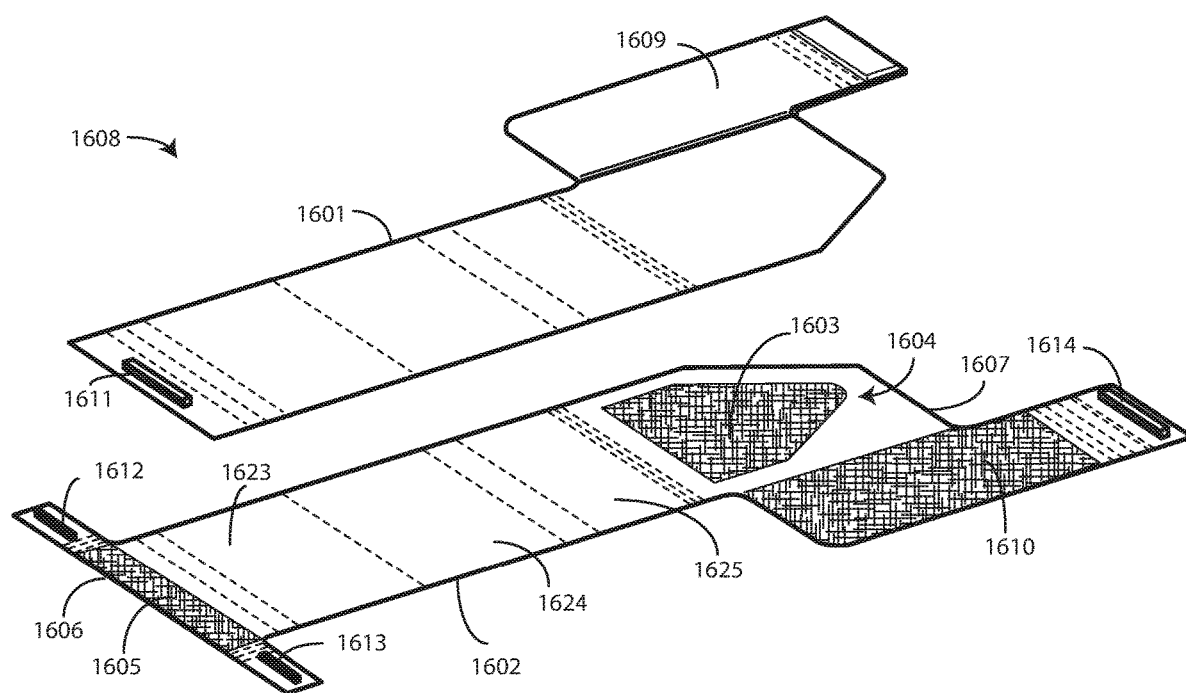
FIG. 16 illustrates still another explanatory flexible substrate in accordance with one or more embodiments of the disclosure.

Turning now to FIG. 16, illustrated therein is another illustrative flexible substrate 1608 configured in accordance with one or more embodiments of the disclosure. In this illustrative embodiment, a first flexible substrate 1601 and a second flexible substrate 1602 are adhesively bonded together using adhesive 1603, which is selectively disposed in two adhesive regions 1604,1605. The first adhesive region 1604 is configured as a baseball home plate in this embodiment, while the second adhesive region 1605 is configured as a rectangle. These shapes and locations for the adhesive regions 1604,1605 are illustrative only, as numerous others will be obvious to those of ordinary skill in the art having the benefit of this disclosure.

A movable region separates a first end 1606 and a second end 1607 of the flexible substrate 1608. As before, the movable region includes a first dynamic region 1623, a hinge spanning region 1624, and a second dynamic region 1625. The use of adhesive 1603 at the first end 1606 and the second end 1607 advantageously allows for an air gap to remain between the first flexible substrate 1601 and the second flexible substrate 1602 in the movable region. Double-layered tails 1609,1610 can extend from the second end 1607 of the first flexible substrate 1601 and the second flexible substrate 1602 for routing to electrical components. Similarly, electrical connectors 1611,1612,1613,1614 can be coupled to one or both of the first end 1606 or the second end 1607 for coupling to electrical circuit elements in one or more embodiments. (Note that in one embodiment, an electrical connector similar to electrical connector 1614 appears at the end of first flexible substrate 1601 at the end opposite that at which electrical connector 1611 is positioned on the bottom side of first flexible substrate 1601.)

Figure 17:
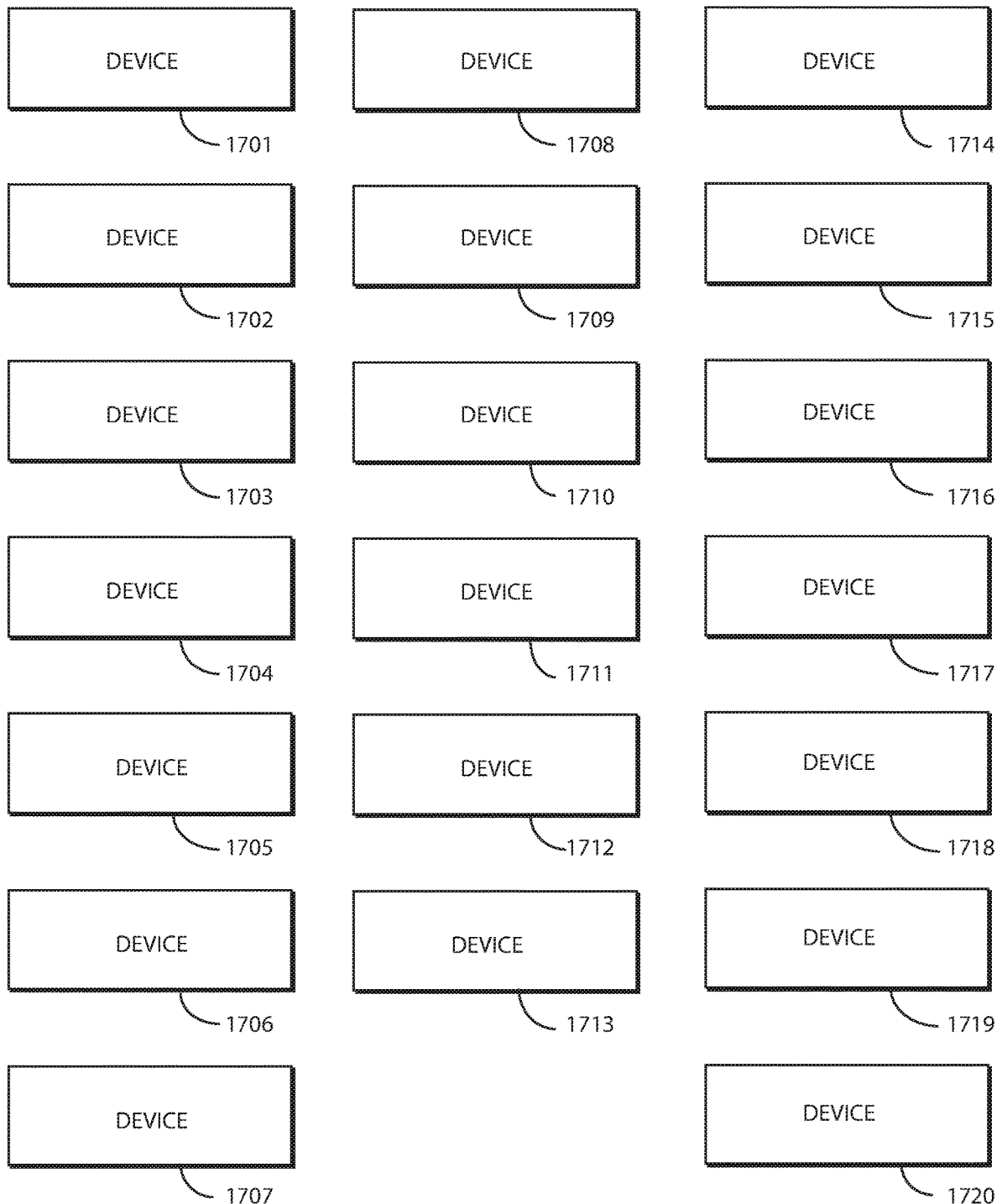
FIG. 17 illustrates various embodiments of the disclosure.

Turning now to FIG. 17, illustrated therein are various embodiments of the disclosure. At 1701, an electronic device comprises a first device housing and a second device housing. At 1701, the electronic device comprises a hinge coupling the first device housing to the second device housing. At 1701, the first device housing is pivotable about the hinge relative to the second device housing.

At 1701, the hinge separates a first chamber defined by the first device housing from a second chamber defined by the second device housing. At 1701, a flexible substrate passes through the first chamber and the second chamber and spans the hinge. At 1701, the flexible substrate deforms to a deformed state within one or both of the first chamber or the second chamber when the first device housing and the second device housing pivot about the hinge from a closed position to an axially displaced open position.

At 1702, the flexible substrate of 1701 comprises a first end fixedly coupled at a first location within the first device housing and a second end fixedly coupled at a second location within the second device housing. At 1703, the first chamber of 1702 is situated between the first location and the hinge, while the second chamber is situated between the second location and the hinge. At 1704, the flexible substrate of 1703 removes deformations of the deformed state when the first device housing and the second device housing are pivoted about the hinge to the closed position.

At 1705, the flexible substrate of 1703 defines a curvilinear shape in one or both of the first chamber or the second chamber when in the deformed state. At 1706, the curvilinear shape of 1705 defines at least one apex and at least one nadir. At 1707, the first chamber and the second chamber of 1706 each have an upper surface and a lower surface limiting an amplitude of the at least one apex and a depth of the at least one nadir.

At 1708, the upper surface and the lower surface of the first chamber of 1707 comprise portions of the first device housing, while the upper surface and the lower surface of the second chamber comprise portions of the second device housing.

At 1709, the electronic device of 1707 further includes a first support plate pivotally coupled to a first side of the hinge and extending distally into the first chamber from the first side of the hinge. At 1709, the electronic device further includes a second support plate pivotally coupled to a second side of the hinge and extending distally into the second chamber from the second side of the hinge. At 1710, the first support plate of 1709 defines the upper surface of the first chamber, while the second support plate of 1709 defines the upper surface of the second chamber.

At 1711, each of the first chamber and the second chamber of 1709 define an inclined plane. At 1711, a distal end of each of the first support plate and the second support plate travels along the inclined plane between a first position within the first chamber and the second chamber, respectively, to a second position within the first chamber and the second chamber, respectively, when the first device housing and the second device housing pivot about the hinge from the axially displaced open position to the closed position.

At 1712, the electronic device of 1711 further comprises a flexible display coupled to the first device housing and the second device housing and spanning the hinge. At 1712, the flexible display spans a first side of the hinge and the flexible substrate spans a second side of the hinge.

At 1713, an electronic device comprises a first device housing and a second device housing. At 1713, a hinge couples the first device housing and the second device housing. At 1713, the first device housing is pivotable about the hinge relative to the second device housing between an axially displaced open position and a closed position.

At 1713, a flexible substrate spans the hinge. At 1713, the flexible substrate comprises a first end anchored within the first device housing at a first location and a second end anchored within the second device housing at a second location. At 1713, the flexible substrate defines a first dynamic region between the first location and the hinge. At 1713, the flexible substrate defines a second dynamic region between the second location and the hinge. At 1713, the flexible substrate defines a hinge-spanning region between the first dynamic region and the second dynamic region. At 1713, the first dynamic region and the second dynamic region deform when the first device housing and the second device housing pivot about the hinge from the closed position to the axially displaced open position.

At 1714, the first dynamic region and the second dynamic region of 1713 extend a first distance between the hinge and the first location and the second location, respectively, when the first device housing and the second device housing pivot about the hinge from the axially displaced open position to the closed position. At 1715, the first dynamic region and the second dynamic region of 1714 extend a second distance between the hinge and the first location and the second location, respectively, when the first device housing and the second device housing pivot about the hinge from the closed position to the axially displaced open position. At 1715, the second distance is less than the first distance.

At 1716, the electronic device of 1713 further comprises a first electronic circuit fixedly situated within the first device housing and a second electronic circuit fixedly situated within the second device housing. At 1716, the flexible substrate electrically couples the first electronic circuit to the second electronic circuit.

At 1717, one or both of the first dynamic region or the second dynamic region of 1713 deform by transitioning from a substantially straight shape to a curvilinear shape. At 1718, the electronic device of 1713 further comprises a first display coupled to the first device housing and a second display coupled to the second device housing.

At 1719, an electronic device comprises a first device housing and a second device housing. At 1719, the electronic device comprises a hinge coupling the first device housing and the second device housing, with the first device housing pivotable about the hinge relative to the second device housing between an axially displaced open position and a closed position.

At 1719, the electronic device comprises a flexible substrate spanning a first portion of the hinge. At 1719, the flexible substrate comprises a first end anchored within the first device housing at a first location and a second end anchored within the second device housing at a second location. At 1719, the flexible substrate is less slack about the hinge when the first device housing and the second device housing pivot about the hinge to the closed position, and more slack about the hinge when the first device housing and the second device housing pivot to the axially displaced open position.

At 1720, the electronic device of 1719 further comprises a flexible display coupled to the first device housing and the second device housing. At 1720 the flexible display spans a second side of the hinge.

As shown and described, embodiments of the disclosure provide an electronic device hinge. The hinge can include a hinge housing, which may define a channel through which a flexible substrate may pass. The flexible substrate may then pass through a first chamber disposed to one side of the hinge housing and a second chamber disposed to the second side of the hinge housing. The portion of the flexible substrate passing through the first chamber can define a dynamic folding region, as can the portion of the flexible substrate passing through the second chamber. The portion spanning the hinge housing or the channel therein can be static. When the first device housing and the second device housing are pivoted to the closed position, the dynamic regions can be substantially flat. When the first device housing and the second device housing are pivoted to the axially displaced open position, the dynamic folding regions can deform to a concertina or at least partially sinusoidal shape. The first chamber and the second chamber can expand about the dynamic regions to allow this deformation of the flexible substrate when movable support plates are included. This shape can then expand back to the substantially straight shape when the electronic device is again closed.

In the foregoing specification, specific embodiments of the present disclosure have been described. However, one of ordinary skill in the art appreciates that various modifications and changes can be made without departing from the scope of the present disclosure as set forth in the claims below. Thus, while preferred embodiments of the disclosure have been illustrated and described, it is clear that the disclosure is not so limited. Numerous modifications, changes, variations, substitutions, and equivalents will occur to those skilled in the art without departing from the spirit and scope of the present disclosure as defined by the following claims. Accordingly, the specification and figures are to be regarded in an illustrative rather than a restrictive sense, and all such modifications are intended to be included within the scope of present disclosure. The benefits, advantages, solutions to problems, and any element(s) that may cause any benefit, advantage, or solution to occur or become more pronounced are not to be construed as a critical, required, or essential features or elements of any or all the claims.

What is claimed is:

1. An electronic device, comprising:
   a first device housing and a second device housing;
   a hinge coupling the first device housing to the second device housing, the first device housing pivotable about the hinge relative to the second device housing, the hinge situated between and separating a first chamber defined by the first device housing and a second chamber defined by the second device housing; and
   a flexible substrate passing through the first chamber and the second chamber and spanning the hinge;
   the flexible substrate deforming to a deformed state within one or both of the first chamber or the second chamber when the first device housing and the second device housing pivot about the hinge from a closed position to an axially displaced open position; and
   the flexible substrate removing deformations of the deformed state within the one or both of the first chamber or the second chamber when the first device housing and the second device housing are pivoted about the hinge to the closed position.

2. The electronic device of claim 1, the flexible substrate becoming less slack when the first device housing and the second device housing are pivoted about the hinge to the closed position.

3. The electronic device of claim 1, the flexible substrate comprising a first end fixedly coupled at a first location within the first device housing and a second end fixedly coupled at a second location within the second device housing.

4. The electronic device of claim 3, the flexible substrate removing the deformations of the deformed state between the first location and the second location when the first device housing and the second device housing are pivoted about the hinge to the closed position.

5. The electronic device of claim 1, the flexible substrate defining a curvilinear shape in one or both of the first chamber or the second chamber when in the deformed state.

6. The electronic device of claim 5, the curvilinear shape defining at least one apex and at least one nadir.

7. The electronic device of claim 6, the first chamber and the second chamber each having an upper surface and a lower surface limiting an amplitude of the at least one apex and a depth of the at least one nadir.

8. The electronic device of claim 7, wherein the upper surface and the lower surface of the first chamber comprise portions of the first device housing, and wherein the upper surface and the lower surface of the second chamber comprise portions of the second device housing.

9. The electronic device of claim 7, further comprising:
   a first support plate pivotally coupled to a first side of the hinge and extending distally into the first chamber from the first side of the hinge; and
   a second support plate pivotally coupled to a second side of the hinge and extending distally into the second chamber from the second side of the hinge.

10. The electronic device of claim 9, wherein the first support plate defines the upper surface of the first chamber and the second support plate defines the upper surface of the second chamber.

11. The electronic device of claim 9, each of the first chamber and the second chamber defining an inclined plane, wherein a distal end of each of the first support plate and the second support plate travels along the inclined plane between a first position within the first chamber and the second chamber, respectively, to a second position within the first chamber and the second chamber, respectively, when the first device housing and the second device housing pivot about the hinge from the axially displaced open position to the closed position.

12. The electronic device of claim 11, further comprising a flexible display coupled to the first device housing and the second device housing and spanning the hinge, the flexible display spanning a first side of the hinge and the flexible substrate spanning a second side of the hinge.

13. An electronic device, comprising;
   a first device housing and a second device housing;
   a hinge coupling the first device housing and the second device housing, with the first device housing pivotable about the hinge relative to the second device housing between an axially displaced open position and a closed position; and
   a flexible substrate spanning the hinge and comprising a first end anchored within the first device housing at a first location and a second end anchored within the second device housing at a second location, the flexible substrate defining:
      a first dynamic region between the first location and the hinge;
      a second dynamic region between the second location and the hinge; and
      a hinge-spanning region between the first dynamic region and the second dynamic region; and
   the first dynamic region and the second dynamic region deforming at both the first dynamic region and the second dynamic region when the first device housing and the second device housing pivot about the hinge from the closed position to the axially displaced open position;
   the first dynamic region and the second dynamic region becoming at least partially straightened when the first device housing and the second device housing pivot about the hinge from the axially displaced open position to the closed position; and the first dynamic region and the second dynamic region extending a first distance between the hinge and the first location and the second location, respectively, when the first device housing and the second device housing pivot about the hinge from the axially displaced open position to the closed position, the first dynamic region and the second dynamic region extending a second distance between the hinge and the first location and the second location, respectively, when the first device housing and the second device housing pivot about the hinge from the closed position to the axially displaced open position, wherein the second distance is less than the first distance.

14. The electronic device of claim 13, the first device housing defining a first chamber and the second device housing defining a second chamber, the first dynamic region situated within the first chamber and the second dynamic region situated within the second chamber.

15. The electronic device of claim 14, the first dynamic region and the second dynamic region deforming by transitioning into a curvilinear shape when the first device housing and the second device housing pivot about the hinge from the closed position to the axially displaced open position.

16. The electronic device of claim 13, further comprising a first electronic circuit fixedly situated within the first device housing and a second electronic circuit fixedly situated within the second device housing, the flexible substrate electrically coupling the first electronic circuit to the second electronic circuit.

17. The electronic device of claim 13, one or both of the first dynamic region or the second dynamic region deforming by transitioning from a substantially straight shape to a curvilinear shape.

18. The electronic device of claim 13, further comprising a first display coupled to the first device housing and a second display coupled to the second device housing.

19. An electronic device, comprising:

a first device housing and a second device housing;

a hinge coupling the first device housing to the second device housing, the first device housing pivotable about the hinge relative to the second device housing, the hinge situated between and separating a first chamber defined by the first device housing and a second chamber defined by the second device housing; and a flexible substrate passing through the first chamber and the second chamber and spanning the hinge;

the flexible substrate deforming to a deformed state within one or both of the first chamber or the second chamber when the first device housing and the second device housing pivot about the hinge from a closed position to an axially displaced open position;

the flexible substrate comprising a first end fixedly coupled at a first location within the first device housing and a second end fixedly coupled at a second location within the second device housing;

flexible substrate defining a curvilinear shape in one or both of the first chamber or the second chamber when in the deformed state, the curvilinear shape defining at least one apex and at least one nadir; and the first chamber and the second chamber each having an upper surface and a lower surface limiting an amplitude of the at least one apex and a depth of the at least one nadir.

20. The electronic device of claim 19, further comprising:

a first support plate pivotally coupled to a first side of the hinge and extending distally into the first chamber from the first side of the hinge; and a second support plate pivotally coupled to a second side of the hinge and extending distally into the second chamber from the second side of the hinge.

* * * * *